(12) United States Patent
Wu et al.

(10) Patent No.: US 12,124,947 B2
(45) Date of Patent: Oct. 22, 2024

(54) SYSTEM, METHOD, AND COMPUTER PROGRAM PRODUCT FOR DETERMINING ADVERSARIAL EXAMPLES

(71) Applicant: Visa International Service Association, San Francisco, CA (US)

(72) Inventors: Yuhang Wu, Santa Clara, CA (US); Sunpreet Singh Arora, San Jose, CA (US); Yanhong Wu, Mountain View, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 910 days.

(21) Appl. No.: 17/106,619

(22) Filed: Nov. 30, 2020

(65) Prior Publication Data

US 2021/0166122 A1  Jun. 3, 2021

Related U.S. Application Data

(60) Provisional application No. 63/075,537, filed on Sep. 8, 2020, provisional application No. 62/941,917, filed on Nov. 29, 2019.

(51) Int. Cl.
*G06N 3/08* (2023.01)
*G06F 18/2411* (2023.01)
(Continued)

(52) U.S. Cl.
CPC ........... *G06N 3/08* (2013.01); *G06F 18/2411* (2023.01); *G06N 3/045* (2023.01); *G06N 3/048* (2023.01)

(58) Field of Classification Search
CPC .......... G06N 20/00; G06N 3/08; G06N 3/048; G06N 3/045; G06F 18/2411; G06F 18/24137
See application file for complete search history.

(56) References Cited

U.S. PATENT DOCUMENTS

2019/0073586 A1* 3/2019 Chen ..................... G06N 3/084
2019/0220605 A1  7/2019 Kounavis et al.
(Continued)

FOREIGN PATENT DOCUMENTS

CN          108932527 A     12/2018

OTHER PUBLICATIONS

Arik et al., "Attention-Based Prototypical Learning Towards Interpretable, Confident and Robust Deep Neural Networks", arXiv:1902.06292, Feb. 17, 2019, 15 pages.
(Continued)

*Primary Examiner* — Dave Misir
(74) *Attorney, Agent, or Firm* — The Webb Law Firm

(57) ABSTRACT

Provided are systems for determining adversarial examples that include at least one processor to determine a first additional input from a plurality of additional inputs based on a proximity of the first additional input to an initial input, determine a second additional input from the plurality of additional inputs based on a proximity of the second additional input to the first additional input, generate a first vector embedding, a second vector embedding and a third vector embedding based on the second additional input, generate a first relational embedding, a second relational embedding, and a third relational embedding based on the third vector embedding and the first vector embedding, concatenate the first relational embedding, the second relational embedding, and the third relational embedding to provide a concatenated version, and determine whether the first input is an adversarial example based on the concatenated version. Methods and computer program products are also provided.

17 Claims, 11 Drawing Sheets

(51) Int. Cl.
  *G06N 3/045* (2023.01)
  *G06N 3/048* (2023.01)

(56) References Cited

U.S. PATENT DOCUMENTS

2019/0238568 A1* 8/2019 Goswami ............ G06F 21/566
2020/0410335 A1* 12/2020 Gu .................... G06V 10/776

OTHER PUBLICATIONS

Athalye et al., "Obfuscated Gradients Give a False Sense of Security: Circumventing Defenses to Adversarial Examples", Proceedings of the 35th International Conference on Machine Learning, 2018, 10 pages, Stockholm, Sweden.
Eykholt et al., "Robust Physical-World Attacks on Deep Learning Visual Classification", IEEE Conference on Computer Vision and Pattern Recognition, CVPR 2018, pp. 1625-1634.
Feinman et al., "Detecting Adversarial Samples from Artifacts", arXiv:1703.00410, Nov. 15, 2017, 9 pages.
He et al., "Deep Residual Learning for Image Recognition", IEEE Conference on Computer Vision and Pattern Recognition, CVPR 2016, pp. 770-778.
Hinton et al., "Improving neural networks by preventing co-adaptation of feature detectors", arXiv:1207.0580, Jul. 3, 2012, pp. 1-18.
Ilyas et al., "Adversarial Examples are Not Bugs, They are Features", arXiv:1905.02175, Aug. 12, 2019, pp. 1-37.
Kingma et al., "Adam: A Method for Stochastic Optimization", arXiv:1412.6980, ICLR 2015, , pp. 1-15.
Krizhevsky et al., "Imagenet Classification with Deep Convolutional Neural Networks", Communications of the ACM, Jun. 2017, pp. 84-90, vol. 60, No. 6.
Kurakin et al., "Adversarial Examples In The Physical World", arXiv:1607.02533, ICLR 2017, pp. 1-14, Workshop Track Proceedings.
Lee et al., "A Simple Unified Framework for Detecting Out-of-Distribution Samples and Adversarial Attacks", 32nd Conference on Neural Information Processing Systems, arXiv:1807.03888, 2018, pp. 1-20, Montreal, Canada.
Liu et al., "Generative Counterfactual Introspection for Explainable Deep Learning", arXiv:1907.03077, Jul. 6, 2019, pp. 1-8.
Ma et al., "Characterizing Adversarial Subspaces Using Local Intrinsic Dimensionality", arXiv:1801.02613, ICLR 2018, pp. 1-15.
Madry et al., "Towards Deep Learning Models Resistant to Adversarial Attacks", arXiv:1706.06083, Sep. 4, 2019, pp. 1-28.
Matyasko et al., "Improved Network Robustness with Adversary Critic", 32nd Conference on Neural Information Processing Systems, 2018, pp. 1-10, Montreal, Canada.
Papernot et al., "Deep k-Nearest Neighbors: Towards Confident, Interpretable and Robust Deep Learning", arXiv:1803.04765, Mar. 13, 2018, pp. 1-18.
Raff et al., "Barrage of Random Transforms for Adversarially Robust Defense", IEEE Conference on Computer Vision and Pattern Recognition, CVPR 2019, pp. 6528-6537.
Roth et al., "The Odds are Odd: A Statistical Test for Detecting Adversarial Examples", Proceedings of the 36th International Conference on Machine Learning, 2019, 10 pages, Long Beach, CA.
Snell et al., "Prototypical Networks for Few-shot Learning", 31st Conference on Neural Information Processing Systems, 2017, pp. 1-11, Long Beach, CA.
Sung et al., "Learning to Compare: Relation Network for Few-Shot Learning", IEEE Conference on Computer Vision and Pattern Recognition, CVPR 2018, pp. 1199-1208.
Svoboda et al., "Peernets: Exploiting Peer Wisdom Against Adversarial Attacks", 7th International Conference on Learning Representations, ICLR 2019, pp. 1-16.
Tian et al., "Detecting Adversarial Examples through Image Transformation", Proceedings of the Thirty-Second AAAI Conference on Artificial Intelligence, (AAAI-18), 2018, pp. 4139-4146.
Weiss, "Fast Median and Bilateral Filtering", ACM Trans. Graph., 2006, pp. 519-526.
Yang et al., "ME-Net: Towards Effective Adversarial Robustness with Matrix Estimation", arXiv:1905.11971, May 28, 2019, 22 pages.

\* cited by examiner

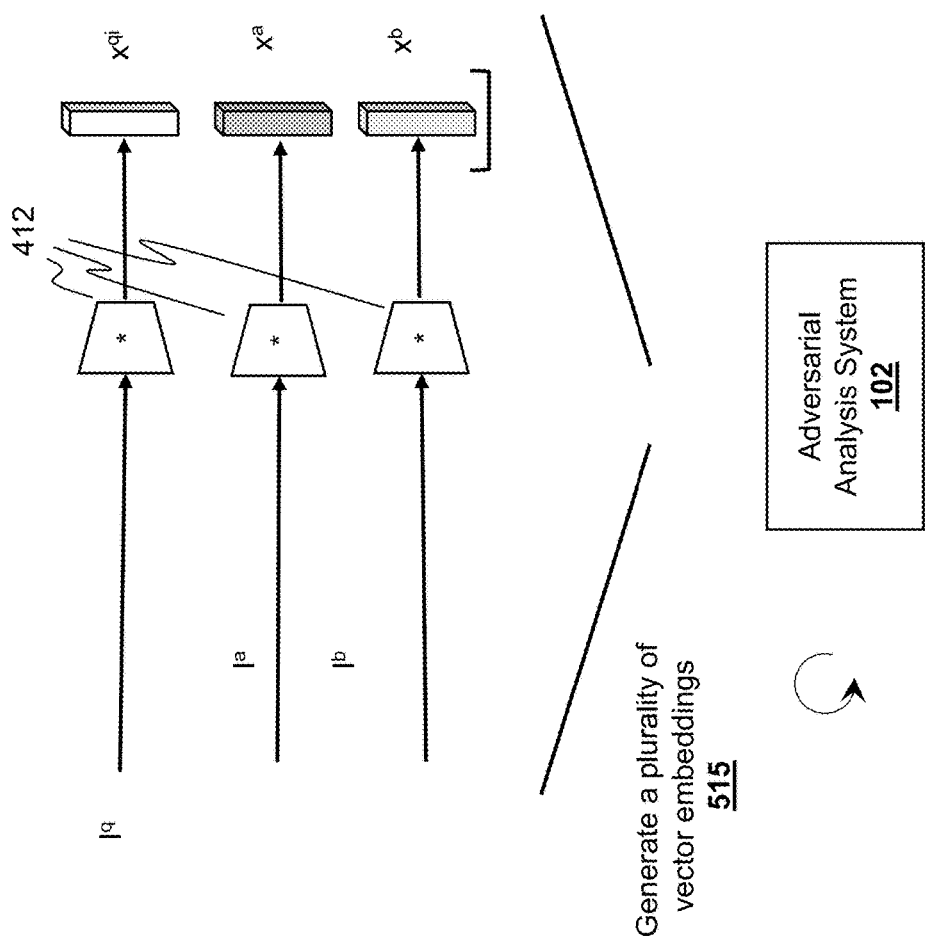

SYSTEM, METHOD, AND COMPUTER PROGRAM PRODUCT FOR DETERMINING ADVERSARIAL EXAMPLES

CROSS-REFERENCE TO RELATED APPLICATIONS

The present application claims priority to U.S. Provisional Patent Application No. 62/941,917, filed on Nov. 29, 2019 and U.S. Provisional Patent Application No. 63/075,537, filed on Sep. 8, 2020, the disclosures of which are hereby incorporated by reference in their entirety.

BACKGROUND

1. Field

This disclosure relates generally to determining adversarial examples and, in some non-limiting embodiments or aspects, to systems, methods, and computer program products for determining adversarial examples based on relational embeddings or determining adversarial examples based on adversarial gradient directions.

2. Technical Considerations

Deep neural networks (DNNs) may be used for classification/prediction tasks in a variety of applications, such as facial recognition, fraud detection, disease diagnosis, and navigation of self-driving cars and/or the like. In such applications, DNNs receive an input and generate predictions based on the input, for example, the identity of an individual, whether a payment transaction is fraudulent or not fraudulent, whether a disease is associated with one or more genetic markers, whether an object in a field of view of a self-driving car is in the self-driving car's path, and/or the like.

However, it may be possible for an adversary to craft malicious inputs to manipulate a DNN's prediction. For example, the adversary may generate a malicious input by adding a small perturbation to a sample input that is imperceptible to a human. The changes can result in an input that, when provided to a machine learning model, causes the machine learning model to make a prediction that is different from a prediction that would have been made by the machine learning model based on an input that does not include the malicious perturbations. This type of input is referred to as an adversarial example. As a result, the machine learning model may generate incorrect predictions based on receiving such adversarial examples as inputs. Although certain techniques have been developed to detect adversarial examples, these techniques may use a number of reference non-adversarial and/or adversarial examples to determine whether an input is an adversarial example. As such, these techniques may require systems implementing the techniques to reserve additional computational resources and store enough samples of adversarial and/or non-adversarial examples to determine whether an input is an adversarial example.

SUMMARY

Accordingly, disclosed are systems, methods, and computer program products for determining adversarial examples.

According to some non-limiting embodiments, provided is a system comprising: at least one processor programmed or configured to: receive an initial input; select a first additional input from a plurality of additional inputs having a classification based on a proximity of the first additional input to the initial input; select a second additional input from the plurality of additional inputs having the classification based on a proximity of the second additional input to the first additional input; generate a first vector embedding based on the initial input; generate a second vector embedding based on the first additional input; generate a third vector embedding based on the second additional input; generate a first relational embedding based on the first vector embedding and the second vector embedding; generate a second relational embedding based on the second vector embedding and the third vector embedding; generate a third relational embedding based on the third vector embedding and the first vector embedding; concatenate the first relational embedding, the second relational embedding, and the third relational embedding to provide a concatenated version of the first relational embedding, the second relational embedding, and the third relational embedding; and determine whether the first input is an adversarial example based on the concatenated version of the first relational embedding, the second relational embedding, and the third relational embedding.

According to some non-limiting embodiments, provided is a computer-implemented method comprising: selecting, with at least one processor, a first additional input from a plurality of additional inputs having a classification based on a proximity of the first additional input to an initial input; selecting, with at least one processor, a second additional input from the plurality of additional inputs having the classification based on a proximity of the second additional input to the first additional input; generating, with at least one processor, a first vector embedding based on the initial input, a second vector embedding based on the first additional input, and a third vector embedding based on the second additional input; generating, with at least one processor, a first relational embedding based on the first vector embedding and the second vector embedding; generating, with at least one processor, a second relational embedding based on the second vector embedding and the third vector embedding; generating, with at least one processor, a third relational embedding based on the third vector embedding and the first vector embedding; concatenating, with at least one processor, the first relational embedding, the second relational embedding, and the third relational embedding to generate a concatenated relational embedding; and determining, with at least one processor, that the first input is an adversarial example based on the concatenated relational embedding.

According to some non-limiting embodiments, provided is a computer program product comprising: at least one non-transitory computer-readable medium including one or more instructions that, when executed by at least one processor, cause the at least one processor to: select a first additional input from a plurality of additional inputs having a classification based on a proximity of the first additional input to the initial input; select a second additional input from the plurality of additional inputs having the classification based on a proximity of the second additional input to the first additional input; generate a first vector embedding based on the initial input; generate a second vector embedding based on the first additional input; generate a third vector embedding based on the second additional input; generate a first relational embedding based on the first vector embedding and the second vector embedding; generate a second relational embedding based on the second vector embedding and the third vector embedding; generate a third relational embedding based on the third vector embedding and the first vector embedding; concatenate the first relational embedding, the second relational embedding, and the third relational embedding to generate a concatenated relational embedding; and determine whether the first input is an adversarial example based on the concatenated relational embedding.

According to some non-limiting embodiments, provided is a system comprising: at least one processor programmed or configured to: receive an example input; determine a predicted classification of the example input; determine a prototype input from a plurality of inputs in a training dataset having a classification that is the same as the predicted classification of the example input; generate a transformation of the example input; generate adversarial examples for each of the example input, the prototype input, and the transformation of the example input; calculate an angular distance similarity score for the adversarial example for the example input and the adversarial example for the prototype input, wherein the angular distance similarity score for the adversarial example for the example input and the adversarial example for the prototype input indicates an angular distance similarity between an adversarial gradient direction of the adversarial example for the example input and an adversarial gradient direction of the adversarial example for the prototype input; calculate an angular distance similarity score for the adversarial example for the example input and the adversarial example for the transformation of the example input, wherein the angular distance similarity score for the adversarial example for the example input and the adversarial example for the transformation of the example input indicates an angular distance similarity between an adversarial gradient direction of the adversarial example for the example input and an adversarial gradient direction of the adversarial example for the prototype input; calculate an angular distance similarity score for the adversarial example for the prototype input and the adversarial example for the transformation of the example input, wherein the angular distance similarity score for the adversarial example for the prototype input and the adversarial example for the transformation of the example input indicates an angular distance similarity between an adversarial gradient direction of the adversarial example for the prototype input and an adversarial gradient direction of the adversarial example for the transformation of the example input; and determine whether the example input is an adversarial example based on the angular distance similarity score for the adversarial example for the example input and the adversarial example for the prototype input, the angular distance similarity score for the adversarial example for the example input and the adversarial example for the transformation of the example input, and the angular distance similarity score for the adversarial example for the prototype input and the adversarial example for the transformation of the example input.

According to some non-limiting embodiments, provided is a computer-implemented method comprising: receiving, with at least one processor, an example input; determining, with at least one processor, a predicted classification of the example input; determining, with at least one processor, a prototype input from a plurality of inputs in a training dataset having a classification that is the same as the predicted classification of the example input; generating, with at least one processor, a transformation of the example input; generating, with at least one processor, adversarial examples for each of the example input, the prototype input, and the transformation of the example input; calculating, with at least one processor, an angular distance similarity score for the adversarial example for the example input and the adversarial example for the prototype input, wherein the angular distance similarity score for the adversarial example for the example input and the adversarial example for the prototype input indicates an angular distance similarity between an adversarial gradient direction of the adversarial example for the example input and an adversarial gradient direction of the adversarial example for the prototype input; calculating, with at least one processor, an angular distance similarity score for the adversarial example for the example input and the adversarial example for the transformation of the example input, wherein the angular distance similarity score for the adversarial example for the example input and the adversarial example for the transformation of the example input indicates an angular distance similarity between an adversarial gradient direction of the adversarial example for the example input and an adversarial gradient direction of the adversarial example for the prototype input; calculating, with at least one processor, an angular distance similarity score for the adversarial example for the prototype input and the adversarial example for the transformation of the example input, wherein the angular distance similarity score for the adversarial example for the prototype input and the adversarial example for the transformation of the example input indicates an angular distance similarity between an adversarial gradient direction of the adversarial example for the prototype input and an adversarial gradient direction of the adversarial example for the transformation of the example input; and determining, with at least one processor, whether the example input is an adversarial example based on the angular distance similarity score for the adversarial example for the example input and the adversarial example for the prototype input, the angular distance similarity score for the adversarial example for the example input and the adversarial example for the transformation of the example input, and the angular distance similarity score for the adversarial example for the prototype input and the adversarial example for the transformation of the example input.

According to some non-limiting embodiments, provided is a computer program product comprising: at least one non-transitory computer-readable medium including one or more instructions that, when executed by at least one processor, cause the at least one processor to: receive an example input; determine a predicted classification of the example input; determine a prototype input from a plurality of inputs in a training dataset having a classification that is the same as the predicted classification of the example input; generate a transformation of the example input; generate adversarial examples for each of the example input, the prototype input, and the transformation of the example input; calculate an angular distance similarity score for the adversarial example for the example input and the adversarial example for the prototype input, wherein the angular distance similarity score for the adversarial example for the example input and the adversarial example for the prototype input indicates an angular distance similarity between an adversarial gradient direction of the adversarial example for the example input and an adversarial gradient direction of the adversarial example for the prototype input; calculate an angular distance similarity score for the adversarial example for the example input and the adversarial example for the transformation of the example input, wherein the angular distance similarity score for the adversarial example for the example input and the adversarial example for the transformation of the example input indicates an angular distance similarity between an adversarial gradient direction of the adversarial example for the example input and an adversarial gradient direction of the adversarial example for the prototype input; calculate an angular distance similarity score for the adversarial example for the prototype input and the adversarial example for the transformation of the example input, wherein the angular distance similarity score for the adversarial example for the prototype input and the adversarial example for the transformation of the example input indicates an angular distance similarity between an adversarial gradient direction of the adversarial example for the prototype input and an adversarial gradient direction of the adversarial example for the transformation of the example input; and determine whether the example input is an adversarial example based on the angular distance similarity score for the adversarial example for the example input and the adversarial example for the prototype input, the angular distance similarity score for the adversarial example for the example input and the adversarial example for the transformation of the example input, and the angular distance similarity score for the adversarial example for the prototype input and the adversarial example for the transformation of the example input.

Further embodiments or aspects are set forth in the following numbered clauses:

Clause 1: A system for determining adversarial examples, comprising: at least one processor programmed or configured to: receive an initial input; select a first additional input from a plurality of additional inputs having a classification based on a proximity of the first additional input to the initial input; select a second additional input from the plurality of additional inputs having the classification based on a proximity of the second additional input to the first additional input; generate a first vector embedding based on the initial input; generate a second vector embedding based on the first additional input; generate a third vector embedding based on the second additional input; generate a first relational embedding based on the first vector embedding and the second vector embedding; generate a second relational embedding based on the second vector embedding and the third vector embedding; generate a third relational embedding based on the third vector embedding and the first vector embedding; concatenate the first relational embedding, the second relational embedding, and the third relational embedding to provide a concatenated version of the first relational embedding, the second relational embedding, and the third relational embedding; and determine whether the first input is an adversarial example based on the concatenated version of the first relational embedding, the second relational embedding, and the third relational embedding.

Clause 2: The system of clause 1, wherein, when generating the first vector embedding, the at least one processor is programmed or configured to: provide the initial input as a first input to an initial machine learning model; generate a first output of the initial machine learning model based on the first input; and extract a first layer of the initial machine learning model, wherein the first layer comprises the first vector embedding; and wherein, when generating the second vector embedding, the at least one processor is programmed or configured to: provide the first additional input as a second input to the initial machine learning model; generate a second output of the initial machine learning model based on the second input; and extract a second layer of the initial machine learning model, wherein the second layer comprises the second vector embedding; and wherein, when generating the third vector embedding, the at least one processor is programmed or configured to: provide the second additional input as a third input to the initial machine learning model; generate a third output of the initial machine learning model based on the third input; and extract a third layer of the initial machine learning model, wherein the third layer comprises the third vector embedding.

Clause 3: The system of clauses 1 or 2, wherein the initial machine learning model comprises a convolutional neural network.

Clause 4: The system of any of clauses 1-3, wherein, when generating the first relational embedding, the at least one processor is programmed or configured to: concatenate the first vector embedding and the second vector embedding to provide a concatenated version of the first vector embedding and the second vector embedding; provide the concatenated version of the first vector embedding and the second vector embedding as a first input to a machine learning model; generate a first output of the machine learning model based on the first input; extract a first layer of the machine learning model, wherein the first layer comprises the first relational embedding; wherein, when generating the second relational embedding, the at least one processor is programmed or configured to: concatenate the second vector embedding and the third vector embedding to provide a concatenated version of the second vector embedding and the third vector embedding; and provide the concatenated version of the second vector embedding and the third vector embedding as a second input to the machine learning model; generate a second output of the machine learning model based on the second input; extract a second layer of the machine learning model, wherein the second layer comprises the second relational embedding; wherein, when determining the third relational embedding, the at least one processor is programmed or configured to: concatenate the first vector embedding and the third vector embedding to provide a concatenated version of the first vector embedding and the third vector embedding; and provide the concatenated version of the first vector embedding and the third vector embedding as a third input to the machine learning model; generate a third output of the machine learning model based on the third input; extract a third layer of the machine learning model, wherein the third layer comprises the third relational embedding.

Clause 5: The system of any of clauses 1-4, wherein the machine learning comprises a multilayer perceptron.

Clause 6: The system of any of clauses 1-5, wherein, when determining whether the first input is an adversarial example, the at least one processor is programmed or configured to: provide the concatenated relational embedding as an input to a machine learning model; generate an output of the machine learning model, wherein the output comprises a prediction that indicates whether the initial input is an adversarial example; and determine whether the first input is an adversarial example based on the prediction.

Clause 7: The system of any of clauses 1-6, wherein the machine learning model comprises a multilayer perceptron.

Clause 8: The system of any of clauses 1-7, wherein, when generating the first vector embedding, the at least one processor is programmed or configured to: provide the initial input as a first input to an initial machine learning model; generate a first output of the initial machine learning model based on the first input; extract a first layer of the initial machine learning model, wherein the first layer comprises the preliminary first vector embedding; concatenate the preliminary first vector embedding, the second vector embedding, and the third vector embedding to provide a concatenated version of the preliminary first vector embedding, the second vector embedding, and the third vector embedding; provide the concatenated version of the preliminary first vector embedding, the second vector embedding, and the third vector embedding as an input to an additional machine learning model; and generate an output of the additional machine learning model based on the input, wherein the output of the additional machine learning model comprises an updated initial input; provide the updated initial input as a second input to the initial machine learning model; generate a second output of the initial machine learning model based on the second input; extract a second layer of the initial machine learning model, wherein the second layer comprises the first vector embedding.

Clause 9: A computer-implemented method for determining adversarial examples, the computer-implemented method comprising: selecting, with at least one processor, a first additional input a plurality of additional inputs having a classification based on a proximity of the first additional input to the initial input; selecting, with at least one processor, a second additional input from the plurality of additional inputs having the classification based on a proximity of the second additional input to the first additional input; generating, with at least one processor, a first vector embedding based on the initial input, a second vector embedding based on the first additional input, and a third vector embedding based on the second additional input; generating, with at least one processor, a first relational embedding based on the first vector embedding and the second vector embedding; generating, with at least one processor, a second relational embedding based on the second vector embedding and the third vector embedding; generating, with at least one processor, a third relational embedding based on the third vector embedding and the first vector embedding; concatenating, with at least one processor, the first relational embedding, the second relational embedding, and the third relational embedding to generate a concatenated relational embedding; and determining, with at least one processor, that the first input is an adversarial example based on the concatenated relational embedding.

Clause 10: The computer-implemented method of clause 9, wherein generating the first vector embedding comprises: providing the initial input as a first input to an initial machine learning model; generating a first output of the initial machine learning model based on the first input; and extracting a first layer of the initial machine learning model, wherein the first layer comprises the first vector embedding; and wherein generating the second vector embedding comprises: providing the first additional input as a second input to the initial machine learning model; generating a second output of the initial machine learning model based on the second input; and extracting a second layer of the initial machine learning model, wherein the second layer comprises the second vector embedding; and wherein generating the third vector embedding comprises: providing the second additional input as a third input to the initial machine learning model; generating a third output of the initial machine learning model based on the third input; extracting a third layer of the initial machine learning model, wherein the third layer comprises the third vector embedding.

Clause 11: The computer-implemented method of clauses 9 or 10, wherein generating the first relational embedding comprises: concatenating the first vector embedding and the second vector embedding to provide a concatenated version of the first vector embedding and the second vector embedding; providing the concatenated version of the first vector embedding and the second vector embedding as a first input to a machine learning model; generating a first output of the machine learning model based on the first input; extracting a first layer of the machine learning model, wherein the first layer comprises the first relational embedding; wherein generating the second relational embedding comprises: concatenating the second vector embedding and the third vector embedding to provide a concatenated version of the second vector embedding and the third vector embedding; providing the concatenated version of the second vector embedding and the third vector embedding as a second input to the machine learning model; generating a second output of the machine learning model based on the second input; and extracting a second layer of the machine learning model, wherein the second layer comprises the second relational embedding; and wherein generating the third relational embedding comprises: concatenating the first vector embedding and the third vector embedding to provide a concatenated version of the first vector embedding and the third vector embedding; providing the concatenated version of the first vector embedding and the third vector embedding as a third input to the machine learning model; generating a third output of the machine learning model based on the third input; and extract a third layer of the machine learning model, wherein the third layer comprises the third relational embedding.

Clause 12: The computer-implemented method of any of clauses 9-11, wherein determining whether the initial input is an adversarial example comprises: providing the concatenated relational embedding as an input to a machine learning model; generating an output of the machine learning model, wherein the output comprises a prediction that indicates whether the initial input is an adversarial example; and determining whether the initial input is an adversarial example based on the prediction.

Clause 13: The computer-implemented method of any of clauses 9-12, wherein generating the first vector embedding comprises: providing the initial input as a first input to an initial machine learning model; generating a first output of the initial machine learning model based on the first input; extracting a first layer of the initial machine learning model, wherein the first layer comprises the preliminary first vector embedding; concatenating the preliminary first vector embedding, the second vector embedding, and the third vector embedding to provide a concatenated version of the preliminary first vector embedding, the second vector embedding, and the third vector embedding; providing the concatenated version of the preliminary first vector embedding, the second vector embedding, and the third vector embedding as an input to an additional machine learning model; and generating an output of the additional machine learning model based on the input, wherein the output of the additional machine learning model comprises an updated initial input; providing the updated initial input as a second input to the initial machine learning model; generating a second output of the initial machine learning model based on the second input; extracting a second layer of the initial machine learning model, wherein the second layer comprises the first vector embedding.

Clause 14: A computer program product for determining adversarial examples, the computer program product comprising at least one non-transitory computer-readable medium including one or more instructions that, when executed by at least one processor, cause the at least one processor to: select a first additional input a plurality of additional inputs having a classification based on a proximity of the first additional input to the initial input; select a second additional input from the plurality of additional inputs having the classification based on a proximity of the second additional input to the first additional input; generate a first vector embedding based on the initial input; generate a second vector embedding based on the first additional input; generate a third vector embedding based on the second additional input; generate a first relational embedding based on the first vector embedding and the second vector embedding; generate a second relational embedding based on the second vector embedding and the third vector embedding; generate a third relational embedding based on the third vector embedding and the first vector embedding; concatenate the first relational embedding, the second relational embedding, and the third relational embedding to generate a concatenated relational embedding; and determine whether the first input is an adversarial example based on the concatenated relational embedding.

Clause 15: The computer program product of clause 14, wherein, the one or more instructions that cause the at least one processor to generate the first vector embedding, cause the at least one processor to: provide the initial input as a first input to an initial machine learning model; generate a first output of the initial machine learning model based on the first input; and extract a first layer of the initial machine learning model, wherein the first layer comprises the first vector embedding; and wherein, the one or more instructions that cause the at least one processor to generate the second vector embedding, cause the at least one processor to: provide the first additional input as a second input to the initial machine learning model; generate a second output of the initial machine learning model based on the second input; and extract a second layer of the initial machine learning model, wherein the second layer comprises the second vector embedding; and wherein, the one or more instructions that cause the at least one processor to generate the third vector embedding, cause the at least one processor to: provide the second additional input as a third input to the initial machine learning model; generate a third output of the initial machine learning model based on the third input; extract a third layer of the initial machine learning model, wherein the third layer comprises the third vector embedding.

Clause 16: The computer program product of clauses 14 or 15, wherein the initial machine learning model comprises a convolutional neural network.

Clause 17: The computer program product of any of clauses 14-16, wherein the one or more instructions that cause the at least one processor to generate the first relational embedding, cause the at least one processor to: concatenate the first vector embedding and the second vector embedding to provide a concatenated version of the first vector embedding and the second vector embedding; provide the concatenated version of the first vector embedding and the second vector embedding as a first input to a machine learning model; generate a first output of the machine learning model based on the first input; and extract a first layer of the machine learning model, wherein the first layer comprises the first relational embedding; and wherein, the one or more instructions that cause the at least one processor to generate the second relational embedding, cause the at least one processor to: concatenate the second vector embedding and the third vector embedding to provide a concatenated version of the second vector embedding and the third vector embedding; provide the concatenated version of the second vector embedding and the third vector embedding as a second input to the machine learning model; generate a second output of the machine learning model based on the second input; and extract a second layer of the machine learning model, wherein the second layer comprises the second relational embedding; and wherein, the one or more instructions that cause the at least one processor to generate the third relational embedding, cause the at least one processor to: concatenate the first vector embedding and the third vector embedding to provide a concatenated version of the first vector embedding and the third vector embedding; provide the concatenated version of the first vector embedding and the third vector embedding as a third input to the machine learning model; generate a third output of the machine learning model based on the third input; and extract a third layer of the machine learning model, wherein the third layer comprises the third relational embedding.

Clause 18: The computer program product of any of clauses 14-17, wherein the machine learning comprises a multilayer perceptron.

Clause 19: The computer program product of any of clauses 14-18, wherein, the one or more instructions that cause the at least one processor to determine whether the first input is an adversarial example, cause the at least one processor to: provide the concatenated relational embedding as an input to a machine learning model; generate an output of the machine learning model, wherein the output comprises a prediction that indicates whether the initial input is an adversarial example; and determine whether the first input is an adversarial example based on the prediction.

Clause 20: The computer program product of any of clauses 14-19, wherein, the one or more instructions that cause the at least one processor to generate the first vector embedding, cause the at least one processor to: provide the initial input as a first input to an initial machine learning model; generate a first output of the initial machine learning model based on the first input; extract a first layer of the initial machine learning model, wherein the first layer comprises the preliminary first vector embedding; concatenate the preliminary first vector embedding, the second vector embedding, and the third vector embedding to provide a concatenated version of the preliminary first vector embedding, the second vector embedding, and the third vector embedding; provide the concatenated version of the preliminary first vector embedding, the second vector embedding, and the third vector embedding as an input to an additional machine learning model; generate an output of the additional machine learning model based on the input, wherein the output of the additional machine learning model comprises an updated initial input; provide the updated initial input as a second input to the initial machine learning model; generate a second output of the initial machine learning model based on the second input; and extract a second layer of the initial machine learning model, wherein the second layer comprises the first vector embedding.

Clause 21: A system for determining adversarial examples, comprising: at least one processor programmed or configured to: receive an example input; determine a predicted classification of the example input; determine a prototype input from a plurality of inputs in a training dataset having a classification that is the same as the predicted classification of the example input; generate a transformation of the example input; generate adversarial examples for each of the example input, the prototype input, and the transformation of the example input; calculate an angular distance similarity score for the adversarial example for the example input and the adversarial example for the prototype input, wherein the angular distance similarity score for the adversarial example for the example input and the adversarial example for the prototype input indicates an angular distance similarity between an adversarial gradient direction of the adversarial example for the example input and an adversarial gradient direction of the adversarial example for the prototype input; calculate an angular distance similarity score for the adversarial example for the example input and the adversarial example for the transformation of the example input, wherein the angular distance similarity score for the adversarial example for the example input and the adversarial example for the transformation of the example input indicates an angular distance similarity between an adversarial gradient direction of the adversarial example for the example input and an adversarial gradient direction of the adversarial example for the prototype input; calculate an angular distance similarity score for the adversarial example for the prototype input and the adversarial example for the transformation of the example input, wherein the angular distance similarity score for the adversarial example for the prototype input and the adversarial example for the transformation of the example input indicates an angular distance similarity between an adversarial gradient direction of the adversarial example for the prototype input and an adversarial gradient direction of the adversarial example for the transformation of the example input; and determine whether the example input is an adversarial example based on the angular distance similarity score for the adversarial example for the example input and the adversarial example for the prototype input, the angular distance similarity score for the adversarial example for the example input and the adversarial example for the transformation of the example input, and the angular distance similarity score for the adversarial example for the prototype input and the adversarial example for the transformation of the example input.

Clause 22: The system of clause 21, wherein, when generating the transformation of the example input, the at least one processor is programmed or configured to: apply a single random perturbation to the example input.

Clause 23: The system of clauses 21 or 22, wherein the at least one processor is further programmed or configured to: train a classifier based on the angular distance similarity score for the adversarial example for the example input and the adversarial example for the prototype input, the angular distance similarity score for the adversarial example for the example input and the adversarial example for the transformation of the example input, and the angular distance similarity score for the adversarial example for the prototype input and the adversarial example for the transformation of the example input, wherein, when determining whether the example input is an adversarial example, the at least one processor is programmed or configured to: determine whether the example input is an adversarial example using the classifier.

Clause 24: The system of any of clauses 21-23, wherein the at least one processor is further programmed or configured to: determine the adversarial gradient direction of the adversarial example for the example input; determine the adversarial gradient direction of the adversarial example for the prototype input; and determine the adversarial gradient direction of the adversarial example for the transformation of the example input.

Clause 25: The system of any of clauses 21-24, wherein the predicted classification is a first predicted classification, and wherein the at least one processor is further programmed or configured to: determine a second predicted classification of the example input; and determine a second prototype input from a plurality of inputs having a classification that is the same as the second predicted classification of the example input.

Clause 26: The system of any of clauses 21-25, wherein the at least one processor is further programmed or configured to: calculate an angular distance similarity score for the adversarial example for the example input and the adversarial example for the second prototype input, wherein the angular distance similarity score for the adversarial example for the example input and the adversarial example for the second prototype input indicates an angular distance similarity between an adversarial gradient direction of the adversarial example for the example input and an adversarial gradient direction of the adversarial example for the second prototype input; and calculate an angular distance similarity score for the adversarial example for the second prototype input and the adversarial example for the transformation of the example input, wherein the angular distance similarity score for the adversarial example for the second prototype input and the adversarial example for the transformation of the example input indicates an angular distance similarity between an adversarial gradient direction of the adversarial example for the second prototype input and an adversarial gradient direction of the adversarial example for the transformation of the example input.

Clause 27: The system of any of clauses 21-26, wherein, when determining the prototype input from the plurality of inputs in the training dataset having the classification that is the same as the predicted classification of the example input, the at least one processor is programmed or configured to: determine the prototype input as a nearest neighbor to the example input from the plurality of inputs in the training dataset having the classification that is the same as the predicted classification of the example input.

Clause 28: The system of any of clauses 21-27, wherein, when receiving example input, the at least one processor is programmed or configured to: sample a layer of a neural network to obtain a sample; and wherein the example input comprises the sample.

Clause 29: The system of any of clauses 21-28, wherein, when calculating the angular distance similarity score for the adversarial example for the example input and the adversarial example for the prototype input, the at least one processor is programmed or configured to: calculate a difference of median angular distance between the adversarial gradient direction of the adversarial example for the example input and the adversarial gradient direction of the adversarial example for the prototype input.

Clause 30: A computer-implemented method for determining adversarial examples, the method comprising: receiving, with at least one processor, an example input; determining, with at least one processor, a predicted classification of the example input; determining, with at least one processor, a prototype input from a plurality of inputs in a training dataset having a classification that is the same as the predicted classification of the example input; generating, with at least one processor, a transformation of the example input; generating, with at least one processor, adversarial examples for each of the example input, the prototype input, and the transformation of the example input; calculating, with at least one processor, an angular distance similarity score for the adversarial example for the example input and the adversarial example for the prototype input, wherein the angular distance similarity score for the adversarial example for the example input and the adversarial example for the prototype input indicates an angular distance similarity between an adversarial gradient direction of the adversarial example for the example input and an adversarial gradient direction of the adversarial example for the prototype input; calculating, with at least one processor, an angular distance similarity score for the adversarial example for the example input and the adversarial example for the transformation of the example input, wherein the angular distance similarity score for the adversarial example for the example input and the adversarial example for the transformation of the example input indicates an angular distance similarity between an adversarial gradient direction of the adversarial example for the example input and an adversarial gradient direction of the adversarial example for the prototype input; calculating, with at least one processor, an angular distance similarity score for the adversarial example for the prototype input and the adversarial example for the transformation of the example input, wherein the angular distance similarity score for the adversarial example for the prototype input and the adversarial example for the transformation of the example input indicates an angular distance similarity between an adversarial gradient direction of the adversarial example for the prototype input and an adversarial gradient direction of the adversarial example for the transformation of the example input; and determining, with at least one processor, whether the example input is an adversarial example based on the angular distance similarity score for the adversarial example for the example input and the adversarial example for the prototype input, the angular distance similarity score for the adversarial example for the example input and the adversarial example for the transformation of the example input, and the angular distance similarity score for the adversarial example for the prototype input and the adversarial example for the transformation of the example input.

Clause 31: The computer-implemented method of clause 30, wherein generating the transformation of the example input comprises: applying a single random perturbation to the example input.

Clause 32: The computer-implemented method of clauses 30 or 31, further comprising: training a classifier based on the angular distance similarity score for the adversarial example for the example input and the adversarial example for the prototype input, the angular distance similarity score for the adversarial example for the example input and the adversarial example for the transformation of the example input, and the angular distance similarity score for the adversarial example for the prototype input and the adversarial example for the transformation of the example input, wherein determining whether the example input is an adversarial example comprises: determining whether the example input is an adversarial example using the classifier.

Clause 33: The computer-implemented method of any of clauses 30-32, further comprising: determining the adversarial gradient direction of the adversarial example for the example input; determining the adversarial gradient direction of the adversarial example for the prototype input; and determining the adversarial gradient direction of the adversarial example for the transformation of the example input.

Clause 34: The computer-implemented method of any of clauses 30-33, wherein the predicted classification is a first predicted classification, the method further comprising: determining, with at least one processor, a second predicted classification of the example input; and determining, with at least one processor, a second prototype input from a plurality of inputs having a classification that is the same as the second predicted classification of the example input.

Clause 35: The computer-implemented method of any of clauses 30-34, further comprising: calculating an angular distance similarity score for the adversarial example for the example input and the adversarial example for the second prototype input, wherein the angular distance similarity score for the adversarial example for the example input and the adversarial example for the second prototype input indicates an angular distance similarity between an adversarial gradient direction of the adversarial example for the example input and an adversarial gradient direction of the adversarial example for the second prototype input; and calculating an angular distance similarity score for the adversarial example for the second prototype input and the adversarial example for the transformation of the example input, wherein the angular distance similarity score for the adversarial example for the second prototype input and the adversarial example for the transformation of the example input indicates an angular distance similarity between an adversarial gradient direction of the adversarial example for the second prototype input and an adversarial gradient direction of the adversarial example for the transformation of the example input.

Clause 36: The computer-implemented method of any of clauses 30-35, wherein determining the prototype input from the plurality of inputs in the training dataset having the classification that is the same as the predicted classification of the example input comprises: determining the prototype input as a nearest neighbor to the example input from the plurality of inputs in the training dataset having the classification that is the same as the predicted classification of the example input.

Clause 37: A computer program product for determining adversarial examples, the computer program product comprising at least one non-transitory computer-readable medium including one or more instructions that, when executed by at least one processor, cause the at least one processor to: receive an example input; determine a predicted classification of the example input; determine a prototype input from a plurality of inputs in a training dataset having a classification that is the same as the predicted classification of the example input; generate a transformation of the example input; generate adversarial examples for each of the example input, the prototype input, and the transformation of the example input; calculate an angular distance similarity score for the adversarial example for the example input and the adversarial example for the prototype input, wherein the angular distance similarity score for the adversarial example for the example input and the adversarial example for the prototype input indicates an angular distance similarity between an adversarial gradient direction of the adversarial example for the example input and an adversarial gradient direction of the adversarial example for the prototype input; calculate an angular distance similarity score for the adversarial example for the example input and the adversarial example for the transformation of the example input, wherein the angular distance similarity score for the adversarial example for the example input and the adversarial example for the transformation of the example input indicates an angular distance similarity between an adversarial gradient direction of the adversarial example for the example input and an adversarial gradient direction of the adversarial example for the prototype input; calculate an angular distance similarity score for the adversarial example for the prototype input and the adversarial example for the transformation of the example input, wherein the angular distance similarity score for the adversarial example for the prototype input and the adversarial example for the transformation of the example input indicates an angular distance similarity between an adversarial gradient direction of the adversarial example for the prototype input and an adversarial gradient direction of the adversarial example for the transformation of the example input; and determine whether the example input is an adversarial example based on the angular distance similarity score for the adversarial example for the example input and the adversarial example for the prototype input, the angular distance similarity score for the adversarial example for the example input and the adversarial example for the transformation of the example input, and the angular distance similarity score for the adversarial example for the prototype input and the adversarial example for the transformation of the example input.

Clause 38: The computer program product of clause 37, wherein, the one or more instructions that cause the at least one processor to generating the transformation of the example input, cause the at least one processor to: apply a single random perturbation to the example input; and wherein the one or more instructions further cause the at least one processor to: train a classifier based on the angular distance similarity score for the adversarial example for the example input and the adversarial example for the prototype input, the angular distance similarity score for the adversarial example for the example input and the adversarial example for the transformation of the example input, and the angular distance similarity score for the adversarial example for the prototype input and the adversarial example for the transformation of the example input, wherein, the one or more instructions that cause the at least one processor to determine whether the example input is an adversarial example, cause the at least one processor to: determine whether the example input is an adversarial example using the classifier.

Clause 39: The computer program product of clauses 37 or 38, wherein the one or more instructions further cause the at least one processor to: determine the adversarial gradient direction of the adversarial example for the example input; determine the adversarial gradient direction of the adversarial example for the prototype input; and determine the adversarial gradient direction of the adversarial example for the transformation of the example input.

Clause 40: The computer program product of any of clauses 37-39, wherein the predicted classification is a first predicted classification, and wherein one or more instructions further cause the at least one processor to: determine a second predicted classification of the example input; and determine a second prototype input from a plurality of inputs having a classification that is the same as the second predicted classification of the example input.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIGS. 5A-5F are diagrams of non-limiting embodiments or aspects of an implementation of a process for determining adversarial examples with relational embeddings.

DESCRIPTION

Figure 1:
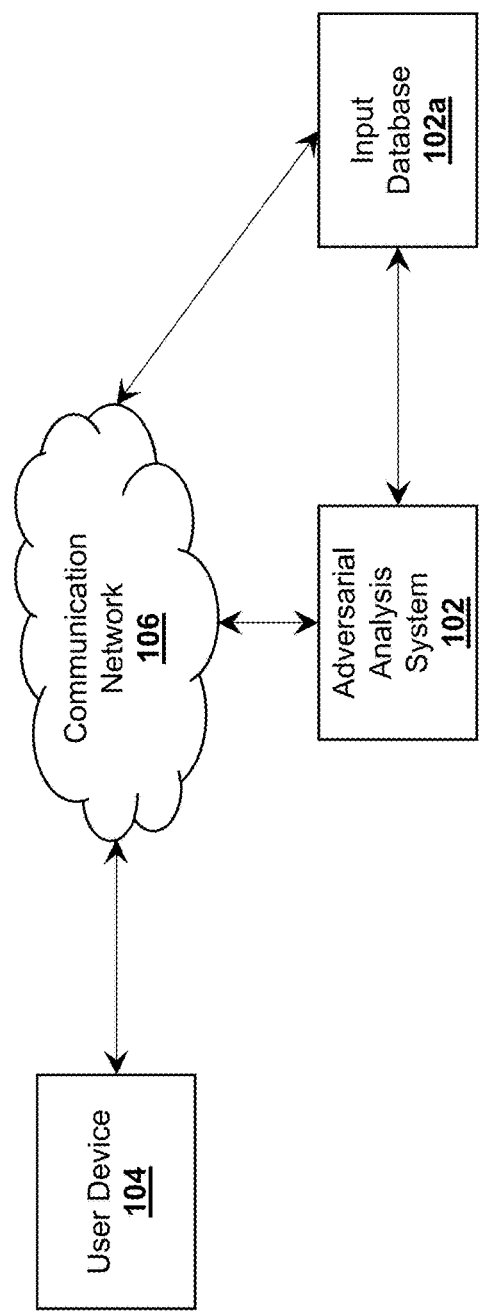
FIG. 1 is a diagram of a non-limiting embodiment or aspect of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The phase "based on" may also mean "in response to" where appropriate.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "client" and "client device" may refer to one or more computing devices, such as processors, storage devices, and/or similar computer components, that access a service made available by a server. In some non-limiting embodiments or aspects, a client device may include a computing device configured to communicate with one or more networks and/or facilitate transactions such as, but not limited to, one or more desktop computers, one or more portable computers (e.g., tablet computers), one or more mobile devices (e.g., cellular phones, smartphones, personal digital assistant, wearable devices, such as watches, glasses, lenses, and/or clothing, and/or the like), and/or other like devices. Moreover, the term "client" may also refer to an entity that owns, utilizes, and/or operates a client device for facilitating transactions with another entity.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided are improved systems, methods, and computer program products for determining adversarial examples.

Embodiments of the present disclosure may include an adversarial analysis system that includes at least one processor programmed or configured to receive an initial input, select a first additional input from a plurality of additional inputs having a classification based on a proximity of the first additional input to the initial input, select a second additional input from the plurality of additional inputs having the classification based on a proximity of the second additional input to the first additional input, generate a first vector embedding based on the initial input, generate a second vector embedding based on the first additional input, generate a third vector embedding based on the second additional input, generate a first relational embedding based on the first vector embedding and the second vector embedding, generate a second relational embedding based on the second vector embedding and the third vector embedding, generate a third relational embedding based on the third vector embedding and the first vector embedding, concatenate the first relational embedding, the second relational embedding, and the third relational embedding to provide a concatenated version of the first relational embedding, the second relational embedding, and the third relational embedding and determine whether the first input is an adversarial example based on the concatenated version of the first relational embedding, the second relational embedding, and the third relational embedding.

Embodiments or aspects of the present disclosure may include an adversarial analysis system that includes at least one processor programmed or configured to receive an example input, determine a predicted classification of the example input, determine a prototype input from a plurality of inputs in a training dataset having a classification that is the same as the predicted classification of the example input, generate a transformation of the example input, generate adversarial examples for each of the example inputs, the prototype input, and the transformation of the example input, calculate an angular distance similarity score for the adversarial example for the example input and the adversarial example for the prototype input, wherein the angular distance similarity score for the adversarial example for the example input and the adversarial example for the prototype input indicates an angular distance similarity between an adversarial gradient direction of the adversarial example for the example input and an adversarial gradient direction of the adversarial example for the prototype input, calculate an angular distance similarity score for the adversarial example for the example input and the adversarial example for the transformation of the example input, wherein the angular distance similarity score for the adversarial example for the example input and the adversarial example for the transformation of the example input indicates an angular distance similarity between an adversarial gradient direction of the adversarial example for the example input and an adversarial gradient direction of the adversarial example for the prototype input, calculate an angular distance similarity score for the adversarial example for the prototype input and the adversarial example for the transformation of the example input, wherein the angular distance similarity score for the adversarial example for the prototype input and the adversarial example for the transformation of the example input indicates an angular distance similarity between an adversarial gradient direction of the adversarial example for the prototype input and an adversarial gradient direction of the adversarial example for the transformation of the example input, and determine whether the example input is an adversarial example based on the angular distance similarity score for the adversarial example for the example input and the adversarial example for the prototype input, the angular distance similarity score for the adversarial example for the example input and the adversarial example for the transformation of the example input, and the angular distance similarity score for the adversarial example for the prototype input and the adversarial example for the transformation of the example input.

In this way, embodiments of the present disclosure allow for a system to accurately identify adversarial examples that may cause a machine learning model to make incorrect predictions. For example, a system may identify adversarial examples with fewer non-adversarial and/or adversarial example samples than would otherwise be needed. As such, the techniques described herein may reduce and/or eliminate the need to reserve additional computational resources and store enough samples of non-adversarial examples and/or adversarial examples to determine whether an input is an adversarial example.

Referring now to FIG. 1, FIG. 1 is a diagram of an example environment 100 in which devices, systems, methods, and/or products described herein may be implemented. As shown in FIG. 1, environment 100 includes adversarial analysis system 102, input database 102a, and user device 104. Adversarial analysis system 102, input database 102a, and user device 104 may interconnect (e.g., establish a connection to communicate, and/or the like) via wired connections, wireless connections, or a combination of wired and wireless connections.

Adversarial analysis system 102 may include one or more computing devices configured to communicate with input database 102a and/or user device 104 via communication network 106. For example, adversarial analysis system 102 may include a group of servers and/or other like devices. In some non-limiting embodiments or aspects, adversarial analysis system 102 may be associated with a transaction service provider, as described herein. Additionally or alternatively, adversarial analysis system 102 may be associated with a merchant, a payment gateway, an acquirer institution, and/or an issuer system, as described herein.

Input database 102a may include one or more computing devices configured to communicate with adversarial analysis system 102 and/or user device 104 via communication network 106. For example, input database 102a may include a server, a group of servers, and/or other like devices. In some non-limiting embodiments or aspects, input database 102a may be associated with a transaction service provider, as described herein. Additionally or alternatively, input database 102a may be associated with a merchant, a payment gateway, an acquirer institution, and/or an issuer system, as described herein.

User device 104 may include a computing device configured to be in communication with adversarial analysis system 102 and/or input database 102a via communication network 106. For example, user device 104 may include a desktop computer (e.g., a client device that communicates with a server) and/or the like. User device 104 may be configured to transmit and/or receive data to and/or from adversarial analysis system 102 and/or input database 102a via an imaging system and/or a short-range wireless communication connection (e.g., an NFC communication connection, an RFID communication connection, a Bluetooth® communication connection, and/or the like). In some non-limiting embodiments or aspects, user device 104 may be associated with a user (e.g., an individual operating a device).

Communication network 106 may include one or more wired and/or wireless networks. For example, communication network 106 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

In some non-limiting embodiments or aspects, transaction data includes transaction parameters associated with transactions, such as payment transactions initiated and/or conducted with an electronic wallet application, and/or the like. Non-limiting examples of transaction parameters include: electronic wallet card data associated with an electronic card (e.g., an electronic credit card, an electronic debit card, an electronic loyalty card, and/or the like), decision data associated with a decision (e.g., a decision to approve or deny a transaction authorization request), authorization data associated with an authorization response (e.g., an approved spending limit, an approved transaction value, and/or the like), a PAN, an authorization code (e.g., a PIN, etc.), data associated with a transaction amount (e.g., an approved limit, a transaction value, etc.), data associated with a transaction date and time, data associated with a conversion rate of a currency, data associated with a merchant type (e.g., goods, grocery, fuel, and/or the like), data associated with an acquiring institution country, data associated with an identifier of a country associated with the PAN, data associated with a response code, data associated with a merchant identifier (e.g., a merchant name, a merchant location, and/or the like), data associated with a type of currency corresponding to funds stored in association with the PAN, and/or the like.

Figure 2:
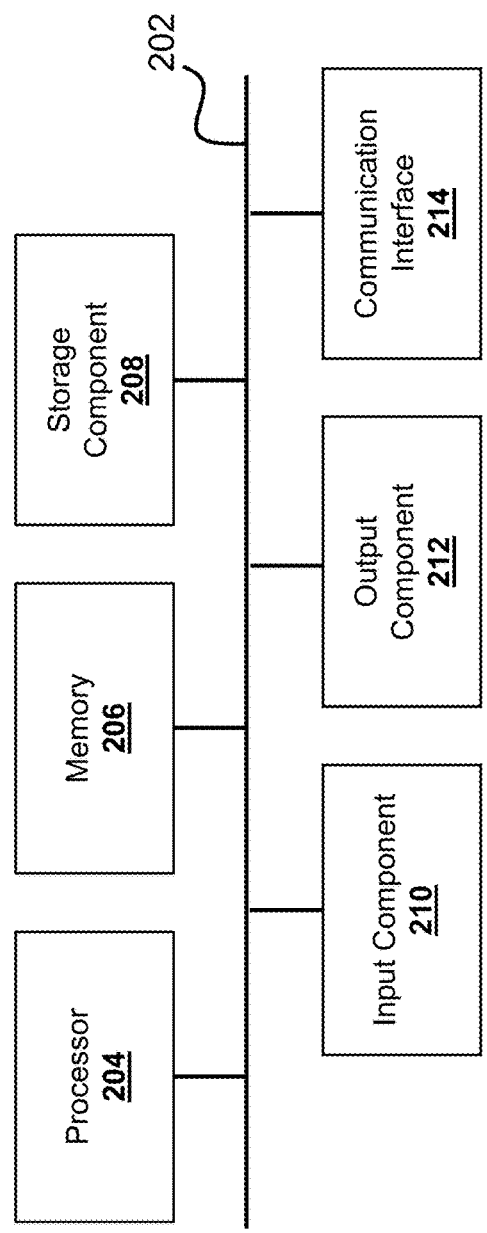
FIG. 2 is a diagram of a non-limiting embodiment or aspect of components of one or more devices and/or one or more systems of FIG. 1.

Referring now to FIG. 2, FIG. 2 is a diagram of example components of device 200. Device 200 may correspond to one or more devices of adversarial analysis system 102, one or more device of input database 102*a*, one or more devices of user device 104, and/or one or more devices of communication network 106. In some non-limiting embodiments or aspects, one or more devices of adversarial analysis system 102, one or more devices of input database 102*a*, one or more devices of user device 104, and/or one or more devices of the communication network 106 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database and/or the like). Device 200 may be capable of receiving information from, storing information in, communicating information to, or searching information stored in the data storage or one or more data structures in memory 206 and/or storage component 208. For example, the information may include input data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
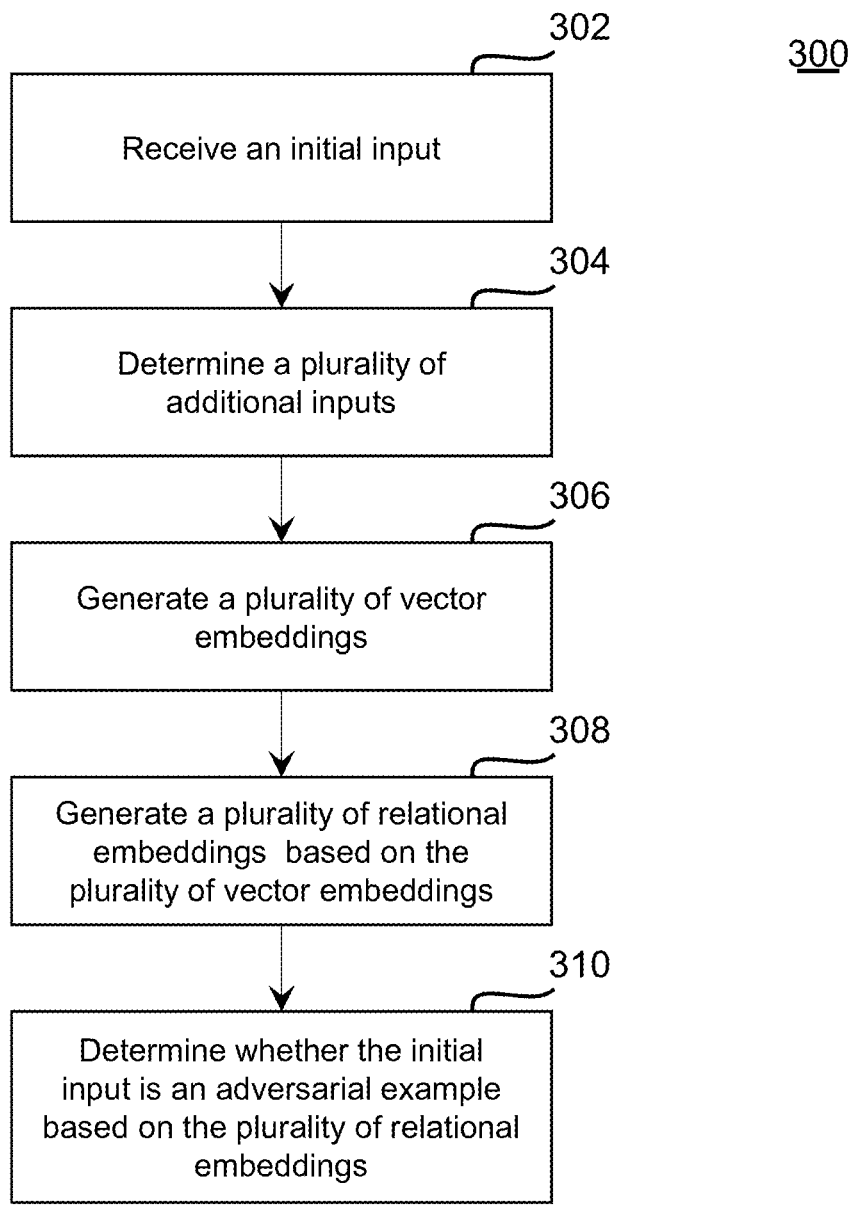
FIG. 3 is a flowchart of a non-limiting embodiment or aspect of a process for determining adversarial examples with relational embeddings.

Referring now to FIG. 3, FIG. 3 is a flowchart of a non-limiting aspect or embodiment of a process 300 for determining adversarial examples with relational embeddings. In some non-limiting embodiments or aspects, one or more of the functions described with respect to process 300 may be performed (e.g., completely, partially, etc.) by adversarial analysis system 102. In some non-limiting embodiments or aspects, one or more of the steps of process 300 may be performed (e.g., completely, partially, and/or the like) by another device or a group of devices separate from and/or including adversarial analysis system 102, such as input database 102a and/or user device 104.

As shown in FIG. 3, at step 302, process 300 may include receiving an initial input. For example, adversarial analysis system 102 may receive one or more initial inputs (e.g., one initial input, a plurality of initial inputs, and/or the like) from a device (e.g., user device 104 and/or a device associated with a merchant, a payment gateway, an acquirer, an issuer, and/or the like). In some non-limiting embodiments or aspects, adversarial analysis system 102 may determine that the initial input is associated with an adversarial example (e.g., a potential adversarial example). For example, adversarial analysis system 102 may determine that the initial input may be associated with an adversarial example based on the device that transmitted the initial input to adversarial analysis system 102. In some non-limiting embodiments or aspects, an input (e.g., the initial input, one or more additional inputs, and/or the like) to adversarial analysis system 102 may include one or more images, one or more videos, one or more voice recordings, one or more key-board strokes, one or more transactions, and/or the like. In some non-limiting embodiments or aspects, an input may include one or more data points.

In some non-limiting embodiments or aspects, adversarial analysis system 102 may determine a classification (e.g., a predicted classification, an initial predicted classification, and/or the like) of the initial input. For example, adversarial analysis system 102 may determine the classification of the initial input by providing the initial input to a machine learning model (e.g., a machine learning model that includes a random forest, a multilayer perceptron, and/or a neural network, such as a deep neural network) and determine the classification as an output from the machine learning model. In some non-limiting embodiments or aspects, the machine learning model may be a machine learning classifier that is trained on a training dataset that includes a plurality of inputs. For example, the machine learning model may be a machine learning classifier that includes a deep learning network. In some non-limiting embodiments or aspects, the classification may be associated with a class that includes a group of members and the classification may refer to a characteristic that shared among the members of the group in the class. In some non-limiting embodiments or aspects, adversarial analysis system 102 may store the training dataset in input database 102a.

As shown in FIG. 3, at step 304, process 300 may include determining a plurality of additional inputs. For example, adversarial analysis system 102 may determine the plurality of additional inputs based on the initial input. In some non-limiting embodiments or aspects, adversarial analysis system 102 may determine the plurality of additional inputs based on determining that the initial input is associated with an adversarial example. In some non-limiting embodiments or aspects, adversarial analysis system 102 may select the plurality of additional inputs from a training dataset based on the initial input. For example, adversarial analysis system 102 may select a plurality of additional inputs from the training dataset that have a classification that is the same as a classification (e.g., the predicted classification) of the initial input. In some non-limiting embodiments or aspects, the training dataset may be the training dataset that was used to train the machine learning model (e.g., the machine learning classifier) that was used to determine a classification of the initial input. In some non-limiting embodiments or aspects, adversarial analysis system 102 may store the plurality of additional inputs in input database 102a.

In some non-limiting embodiments or aspects, adversarial analysis system 102 may determine a first additional input and a second additional input based on the plurality of additional inputs (e.g., the plurality of additional inputs having the same classification as the initial input) and the initial input. For example, adversarial analysis system 102 may select the first additional input based on a proximity of the first additional input to the initial input. In such an example, adversarial analysis system 102 may select the first additional input from the plurality of additional inputs based on the first additional input having the smallest (e.g., shortest) distance to the initial input from the plurality of additional inputs. In some non-limiting embodiments or aspects, adversarial analysis system 102 may select the first additional input from the plurality of additional inputs based on a distance in an embedding space. For example, adversarial analysis system 102 may select the first additional input from the plurality of additional inputs based on the first additional input having the smallest embedding distance to the initial input in the embedding space from the plurality of additional inputs. In some non-limiting embodiments or aspects, adversarial analysis system 102 may select the second additional input based on a proximity of the second additional input to the first additional input. For example, adversarial analysis system 102 may select the second additional input from the plurality of additional inputs based on the second additional input having the smallest distance to the first additional input from the plurality of additional inputs. In some non-limiting embodiments or aspects, adversarial analysis system 102 may select the second additional input from the plurality of additional inputs based on a distance in the embedding space. For example, adversarial analysis system 102 may select the second additional input from the plurality of additional inputs based on the second additional input having the smallest embedding distance to the first additional input in the embedding space from the plurality of additional inputs.

As shown in FIG. 3, at step 306, process 300 may include generating a plurality of vector embeddings. For example, adversarial analysis system 102 may generate the plurality of vector embeddings based on the initial input and the plurality of additional inputs. In some non-limiting embodiments or aspects, the plurality of vector embeddings may include vector embeddings based on the initial input, the first additional input, the second additional input, and/or an updated initial input. In some non-limiting embodiments or aspects, adversarial analysis system 102 may generate the plurality of vector embeddings based on a machine learning model (e.g., an initial machine learning model of a critic network). For example, adversarial analysis system 102 may generate the plurality of vector embeddings by extracting each of the plurality of vector embeddings from one or more layers (e.g., a layer or a plurality of layers) of the machine learning model. In some non-limiting embodiments or aspects, the machine learning model may include a random forest, a multilayer perceptron, a neural network, such as a deep neural network, and/or the like. In one example, the machine learning model may include a convolutional neural network. In such an example, having the machine learning model include a convolutional neural network may require less memory for running the machine learning and allow for the training of a larger, more powerful network as compared to other networks, such as a multilayer perceptron. In this way, adversarial analysis system 102 may more quickly generate each of the plurality of vector embeddings with less resources as compared to another type of machine learning model such as a multilayer perceptron.

In some non-limiting embodiments or aspects, adversarial analysis system 102 may generate a first vector embedding based on the initial input, a first vector embedding based on the updated initial input, a second vector embedding based on the first additional input, and/or a third vector embedding based on the second additional input. In one example, adversarial analysis system 102 may generate the first vector embedding based on the initial input by providing the initial input as a first input to a first machine learning model (e.g., a first initial machine learning model of a critic network), generating an output of the first machine learning model based on the first input (e.g., the initial input), and extracting the first vector embedding from one or more layers of the first machine learning model. Additionally or alternatively, adversarial analysis system 102 may generate the first vector embedding based on the updated initial input by providing the updated initial input as an input to the first machine learning model, generating an output of the first machine learning model based on the input (e.g., the updated initial input), and extracting the first vector embedding from one or more layers of the first machine learning model. Additionally or alternatively, adversarial analysis system 102 may generate the second vector embedding based on the first additional input by providing the first additional input as an input to a second machine learning model (e.g., a second initial machine learning model of a critic network), generating an output of the second machine learning model based on the input (e.g., the first additional input), and extracting the second vector embedding from one or more layers of the second machine learning model. Additionally or alternatively, adversarial analysis system 102 may generate the third vector embedding based on the second additional input by providing the second additional input as an input to a third machine learning model (e.g., a third initial machine learning model of a critic network), generating an output of the third machine learning model based on the input (e.g., the second additional input), and extracting the third vector embedding from one or more layers of the third machine learning model.

In some non-limiting embodiments or aspects, the first machine learning model, the second machine learning model, and/or the third machine learning model may include a convolutional neural network. In some non-limiting embodiments or aspects, the first machine learning model, the second machine learning model, and the third machine learning model may be components of the initial machine learning of a critic network. In one example, the initial machine learning model of the critic network may include a convolutional neural network. In such an example, having the initial machine learning model include a convolutional neural network may require less memory for running the machine learning and allow for the training of a larger, more powerful network as compared to other network, such as a multilayer perceptron. In this way, adversarial analysis system 102 may more quickly generate each of the plurality of vector embeddings with less resources as compared to another type of machine learning model such as a multilayer perceptron.

In some non-limiting embodiments or aspects, adversarial analysis system 102 may generate the first vector embedding based on the initial input by extracting the first vector embedding from one or more layers of the initial machine learning model of a critic network. Additionally or alternatively, adversarial analysis system 102 may generate the second vector embedding based on the first additional input by extracting the second vector embedding from one or more layers of the initial machine learning model of the critic network. Additionally or alternatively, adversarial analysis system 102 may generate the third vector embedding based on the second additional input by extracting the third vector embedding from one or more layers of the initial machine learning model of the critic network. Additionally or alternatively, adversarial analysis system 102 may generate the first vector embedding based on the updated initial input by extracting the first vector embedding from one or more layers of the initial machine learning model of the critic network.

In some non-limiting embodiments or aspects, adversarial analysis system 102 may generate the first vector embedding based on the updated initial input by generating a preliminary first vector embedding based on the initial input, the second vector embedding based on the first additional input, and the third vector embedding based on the second additional input. For example, adversarial analysis system 102 may generate the preliminary first vector embedding based on the initial input by providing the initial input as an input to the initial machine learning model of the critic network, generating an output of the initial machine learning model based on the input (e.g., the initial input), and extracting the preliminary first vector embedding from one or more layers of the initial machine learning model. Additionally, adversarial analysis system 102 may generate the second vector embedding based on the first additional input and the third vector embedding based on the second additional input. Adversarial analysis system 102 may concatenate the preliminary first vector embedding, the second vector embedding, and the third vector embedding to provide a concatenated version of the preliminary first vector embedding, the second vector embedding, and the third vector embedding. Adversarial analysis system 102 may provide the concatenated version of the preliminary first vector embedding, the second vector embedding, and the third vector embedding as an input to an additional machine learning model of the critic network and adversarial analysis system 102 may generate an output of the additional machine learning model of the critic network based on the input (e.g., the concatenated version of the preliminary first vector embedding, the second vector embedding, and the third vector embedding). In the example above, adversarial analysis system 102 may combine (e.g., add) the output generated by the additional machine learning model of the critic network with the initial input to provide the updated initial input. Adversarial analysis system 102 may provide the updated initial input to the initial machine learning model of the critic network, generate an output of the initial machine learning model based on the updated initial input, and adversarial analysis system 102 may extract the first vector embedding from one or more layers of the initial machine learning model of the critic network. In some non-limiting embodiments or aspects, the additional machine learning model of the critic network may include a deconvolutional neural network.

As shown in FIG. 3, at step 308, process 300 may include generating a plurality of relational embeddings based on the plurality of vector embeddings. For example, adversarial analysis system 102 may determine the plurality of relational embeddings based on the plurality of vector embeddings. In some non-limiting embodiments or aspects, the plurality of relational embeddings may include a first relational embedding, a second relational embedding, and a third relational embedding. In some non-limiting embodiments or aspects, adversarial analysis system 102 may generate the first relational embedding based on the first vector embedding and the second vector embedding, the second relational embedding based on the second vector embedding and the third vector embedding, and the third relational embedding based on the third vector embedding and the first vector embedding.

In some non-limiting embodiments or aspects, adversarial analysis system 102 may generate the first relational embedding, the second relational embedding, and the third relational embedding based on the first vector embedding, the second vector embedding, and the third vector embedding. In one example, adversarial analysis system 102 may generate the first relational embedding by concatenating the first vector embedding and the second vector embedding and providing the concatenated version of the first vector embedding and the second vector embedding as an input to a first machine learning model (e.g., a first machine learning model of a prototypical relation network), generating an output of the first machine learning model based on the input (e.g., the concatenated version of the first vector embedding and the second vector embedding), and extracting the first relational embedding from one or more layers of the first machine learning model.

Additionally or alternatively, adversarial analysis system 102 may generate the second relational embedding by concatenating the second vector embedding and the third vector embedding and providing the concatenated version of the second vector embedding and the third vector embedding as an input to a second machine learning model (e.g., a second machine learning model of a prototypical relation network), generating an output of the second machine learning model based on the input (e.g., the concatenated version of the second vector embedding and the third vector embedding), and extracting the second relational embedding from one or more layers of the second machine learning model.

Additionally or alternatively, adversarial analysis system 102 may generate the third relational embedding by concatenating the first vector embedding and the third vector embedding and providing the concatenated version of the first vector embedding and the third vector embedding as an input to a third machine learning model (e.g., a third machine learning model of a prototypical relation network), generating an output of the third machine learning model based on the input (e.g., the concatenated version of the first vector embedding and the third vector embedding), and extracting the third relational embedding from one or more layers of the third machine learning model.

In some non-limiting embodiments or aspects, adversarial analysis system 102 may generate the plurality of relational embeddings by pair-wisely concatenating each of the plurality of vector embeddings and providing each of the pair-wise concatenated versions of vector embeddings as inputs to a machine learning model of a prototypical relation network. In one example, adversarial analysis system 102 may concatenate the first vector embedding and the second vector embedding, the first vector embedding and the third vector embedding, and the second vector embedding and the third vector embedding. Adversarial analysis system 102 may provide the concatenated version of the first vector embedding and the second vector embedding, the concatenated version of the first vector embedding and the third vector embedding, and the concatenated version of the second vector embedding and the third vector embedding as inputs (e.g., separate inputs) to the machine learning model of the prototypical relation network. After providing the concatenated versions as inputs to the machine learning model, adversarial analysis system 102 may extract one or more layers of the machine learning model to provide the plurality of embeddings, which includes the first relational embedding, the second relational embedding, and the third relational embedding. The one or more layers may include the first relational embedding, the second relational embedding, and/or the third relational embedding.

In some non-limiting embodiments or aspects, adversarial analysis system 102 may determine the first relational embedding based on the first vector embedding and the second vector embedding. For example, adversarial analysis system 102 may determine a distance vector (e.g., a vector that includes a distance, such as a Euclidean distance) between the first vector embedding and the second vector embedding and adversarial analysis system 102 may determine the first relational embedding based on the distance vector between the first vector embedding and the second vector embedding.

In some non-limiting embodiments or aspects, adversarial analysis system 102 may determine the distance vector between the first vector embedding and the second vector embedding based on a concatenated version of the first vector embedding with the second vector embedding. For example, adversarial analysis system 102 may concatenate the first vector embedding with the second vector embedding and adversarial analysis system 102 may provide the concatenated version of the first vector embedding and the second vector embedding as a first input to the machine learning model of the prototypical relation network. Adversarial analysis system 102 may generate an output of the machine learning model of the prototypical relation network based on the first input. The first output of the intermediate machine learning model may include a prediction that is associated with the distance vector between the first vector embedding and the second vector embedding. In some non-limiting embodiments or aspects, the machine learning model of the prototypical relation network may include a multilayer perceptron, a random forest, a neural network, such as a convolutional neural network, and/or the like. In one example, the machine learning model of the prototypical relation network may include a multilayer perceptron.

In some non-limiting embodiments or aspects, adversarial analysis system 102 may determine the second relational embedding based on the second vector embedding and the third vector embedding. For example, adversarial analysis system 102 may determine a distance vector between the second vector embedding and the third vector embedding and adversarial analysis system 102 may determine the second relational embedding based on the distance vector between the second vector embedding and the third vector embedding.

In some non-limiting embodiments or aspects, adversarial analysis system 102 may determine the distance vector between the second vector embedding and the third vector embedding based on a concatenated version of the second vector embedding with the third vector embedding. For example, adversarial analysis system 102 may concatenate the second vector embedding with the third vector embedding and adversarial analysis system 102 may provide the concatenated version of the second vector embedding and the third vector embedding as an input to the machine learning model of the prototypical relation network. Adversarial analysis system 102 may generate an output of the machine learning model of the prototypical relation network based on the input (e.g., the concatenated version of the second vector embedding and the third vector embedding). The output of the machine learning model of the prototypical relation network may include a prediction that is associated with the distance vector between the second vector embedding and the third vector embedding.

In some non-limiting embodiments or aspects, adversarial analysis system 102 may determine the third relational embedding based on the first vector embedding and the third vector embedding. For example, adversarial analysis system 102 may determine a distance vector between the first vector embedding and the third vector embedding and may determine the third relational embedding based on the distance vector between the first vector embedding and the third vector embedding.

In some non-limiting embodiments or aspects, adversarial analysis system 102 may determine the distance vector between the first vector embedding and the third vector embedding based on a concatenated version of the first vector embedding with the third vector embedding. For example, adversarial analysis system 102 may concatenate the first vector embedding with the third vector embedding and adversarial analysis system 102 may provide the concatenated version of the first vector embedding and the third vector embedding as an input to the machine learning model of the prototypical relation network. Adversarial analysis system 102 may generate an output of the machine learning model of the prototypical relation network based on the input (e.g., the concatenated version of the first vector embedding and the third vector embedding). The output of the machine learning model of the prototypical relation network may include a prediction that is associated with the distance vector between the first vector embedding and the third vector embedding.

As shown in FIG. 3, at step 310, process 300 may include determining whether the initial input is an adversarial example based on the plurality of relational embeddings. For example, adversarial analysis system 102 may determine whether the initial input is an adversarial example based on the plurality of relational embeddings. In some non-limiting embodiments or aspects, adversarial analysis system 102 may determine whether an input received after the initial input is an adversarial example based on the plurality of relational embeddings. For example, adversarial analysis system 102 may determine whether the input received after training of the machine learning models (e.g., the machine learning models discussed above) is an adversarial example based on the plurality of relational embeddings.

In some non-limiting embodiments or aspects, adversarial analysis system 102 may concatenate the first relational embedding, the second relational embedding, and the third relational embedding to generate a concatenated relational embedding (e.g., the concatenated version of the first relational embedding, the second relational embedding, and the third relational embedding). For example, adversarial analysis system 102 may concatenate the first relational embedding, the second relational embedding, and the third relational embedding to generate the concatenated relational embedding based on adversarial analysis system 102 determining the first relational embedding, the second relational embedding, and/or the third relational embedding. In some non-limiting embodiments or aspects, adversarial analysis system 102 may concatenate the first relational embedding, the second relational embedding, and the third relational embedding by concatenating the first distance vector, the second distance vector, and the third distance vector to generate a concatenated distance vector. In some non-limiting embodiments or aspects, adversarial analysis system 102 may generate the concatenated relational embedding based on the concatenated distance vector.

In some non-limiting embodiments or aspects, adversarial analysis system 102 may determine whether the initial input is an adversarial example based on providing the concatenated relational embedding as an input to a final machine learning model. For example, adversarial analysis system 102 may provide the concatenated relational embedding as an input to the final machine learning model and adversarial analysis system 102 may generate an output of the final machine learning model based on the input (e.g., the concatenated relational embedding). In some non-limiting embodiments or aspects, the output of the final machine learning model may include a prediction that indicates whether the initial input is an adversarial example.

In some non-limiting embodiments or aspects, adversarial analysis system 102 may determine whether the initial input is an adversarial example based on the concatenated distance vector. For example, adversarial analysis system 102 may determine whether the initial input is an adversarial example based on providing the concatenated distance vector as an input to the final machine learning model. Adversarial analysis system 102 may generate an output of the final machine learning model based on the input (e.g., the concatenated distance vector) to the final machine learning model.

In some non-limiting embodiments or aspects, adversarial analysis system 102 may determine whether the initial input is an adversarial example based on the prediction that indicates whether the initial input is an adversarial example. For example, where the prediction is a binary value (e.g., zero or one), adversarial analysis system 102 may determine whether the initial input is an adversarial example based on whether the binary value is associated with a determination that the initial input is an adversarial example or is not an adversarial example. If adversarial analysis system 102 determines that the binary value is associated with an adversarial example, adversarial analysis system 102 may determine that the initial input is an adversarial example. If adversarial analysis system 102 determines that the binary value is not associated with an adversarial example, adversarial analysis system 102 may determine that the initial input is not an adversarial example.

In some non-limiting embodiments or aspects, the prediction may include a value within a range of values (e.g., a range from zero to one), and adversarial analysis system 102 may compare the value to a threshold (e.g., a threshold associated with a determination that an input is an adversarial example). If adversarial analysis system 102 determines that the value satisfies the threshold, adversarial analysis system 102 may determine that the initial input is an adversarial example. If adversarial analysis system 102 determines that the value does not satisfy the threshold, adversarial analysis system 102 may determine that the initial input is not an adversarial example.

Figure 4:
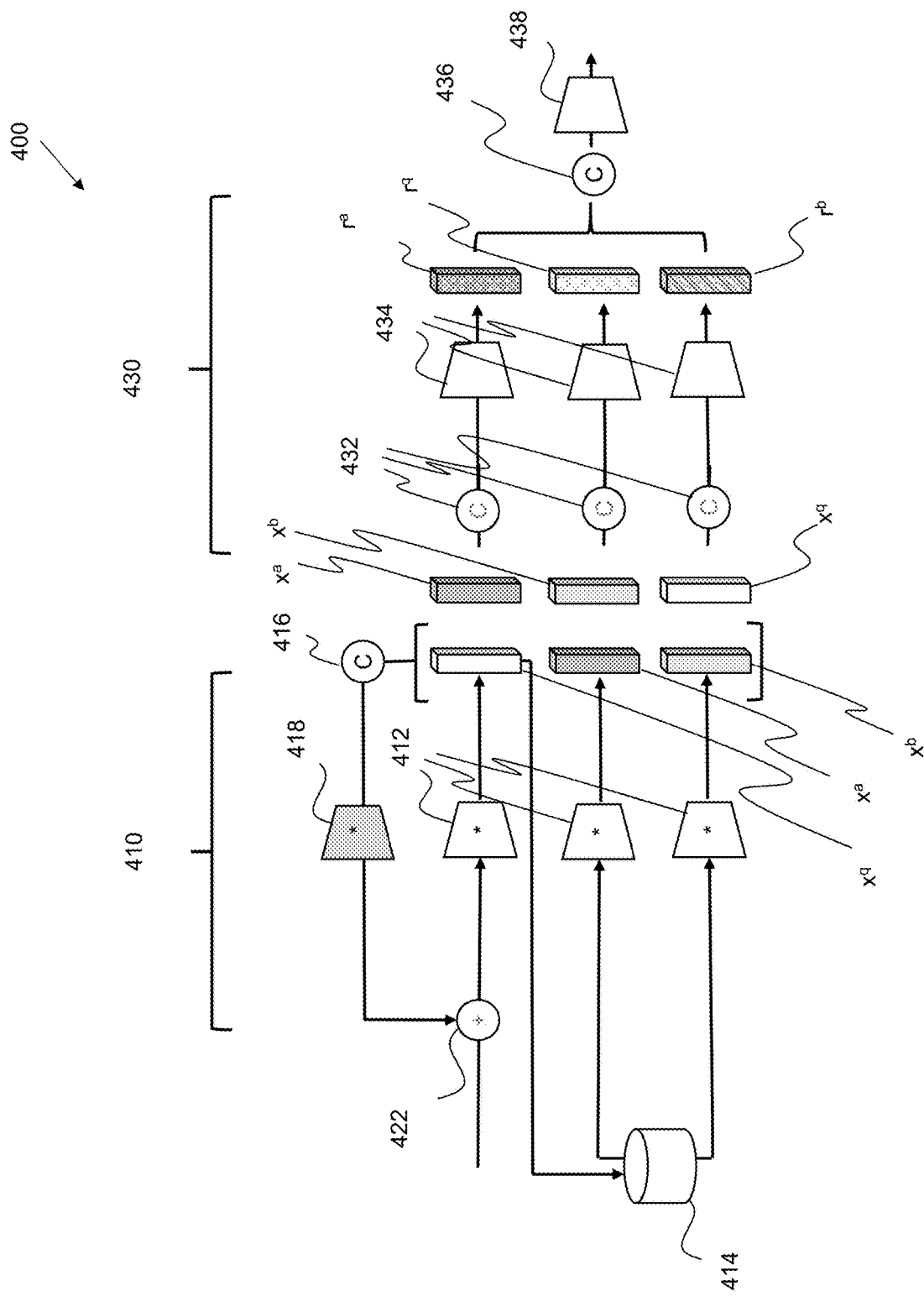
FIG. 4 is a diagram of a non-limiting embodiment or aspect of a machine learning architecture for determining adversarial examples with relational embeddings.

Referring now to FIG. 4, illustrated is a non-limiting embodiment of an example machine learning model architecture 400 for implementing a process (e.g., process 300) for determining an adversarial example using relational embeddings. As shown in FIG. 4, machine learning architecture 400 may include a plurality of network modules. For example, machine learning architecture 400 may include critic network 410 and prototypical relation network 430. In some non-limiting embodiments or aspects, critic network 410 may include initial machine learning model 412 and additional machine learning model 418. In some non-limiting embodiments or aspects, prototypical relation network 430 may include machine learning model 434. In some non-limiting embodiments or aspects, machine learning architecture 400 may include final machine learning model 438 and training database 414. In some non-limiting embodiments or aspects, training database 414 may be the same or similar to input database 102a.

As further shown in FIG. 4, an initial input may be provided as an input to initial machine learning model 412 of critic network 410. In some non-limiting embodiments or aspects, a first vector embedding $x^q$ may be generated based on the input (e.g., the initial input). In some non-limiting embodiments or aspects, additional inputs may be selected from training database 414 based on the initial input. For example, a first additional input and a second additional input may be selected from a training dataset stored in training database 414 based on the initial input. In such an example, the first additional input and the second additional input may be selected from the training dataset based on a distance between the first additional input and the initial input in the embedding space. Additionally, the second additional input may be selected from the training dataset based on a distance between the first additional input and the second additional input in the embedding space. In some non-limiting embodiments or aspects, a second vector embedding $x^a$ may be generated based on the first additional input and a third vector embedding $x^b$ may be generated based on the second additional input.

In some non-limiting embodiments or aspects, the first vector embedding $x^q$ may be generated based on an updated initial input. For example, a preliminary first vector embedding may be generated based on the initial input by providing the initial input as an input to initial machine learning model 412 of critic network 410, an output of the initial machine learning model 412 may be generated based on the input (e.g., the initial input), and the preliminary first vector embedding may be extracted from one or more layers of initial machine learning model 412. The preliminary first vector embedding, the second vector embedding, and the third vector embedding may be concatenated with concatenated version operation 416 to provide a preliminary first vector embedding, where the preliminary first vector embedding is the concatenated version of the preliminary first vector embedding, the second vector embedding, and the third vector embedding. The preliminary first vector embedding may be provided as an input to additional machine learning model 418 of the critic network 410 and an output of additional machine learning model 418 may be generated based on the input (e.g., the preliminary first vector embedding). The output generated by additional machine learning model 418 may be combined with the initial input using combination operation 422 to provide the updated initial input. The updated initial input may be provided to initial machine learning model 412 and the first vector embedding $x^q$ may be generated based on the updated initial input.

As further shown in FIG. 4, each of the plurality of vector embeddings, the first vector embedding, the second vector embedding, and the third vector embedding may be pair-wisely concatenated and each of the pair-wise concatenated versions of vector embeddings may be provided as inputs to machine learning model 434 of prototypical relation network 430. The first vector embedding $x^q$ and the second vector embedding $x^a$ may be concatenated with concatenated version operation 432, the first vector embedding $x^q$ and the third vector embedding $x^b$ may be concatenated with concatenated version operation 432, and the second vector embedding $x^a$ and the third vector embedding $x^b$ may be concatenated with concatenated version operation 432. The concatenated version of the first vector embedding $x^q$ and the second vector embedding $x^a$, the concatenated version of the first vector embedding $x^q$ and the third vector embedding $x^b$, and the concatenated version of the second vector embedding $x^a$ and the third vector embedding $x^b$ may be provided as inputs to machine learning model 434 of prototypical relation network 430.

As further shown in FIG. 4, a first relational embedding $r^q$ may be generated based on the concatenated version of the second vector embedding $x^a$ and the third vector embedding $x^b$, a second relational embedding $r^a$ may be generated based on the concatenated version of the first vector embedding $x^q$ and the second vector embedding $x^a$, and a third relational embedding $r^b$ may be generated based on the concatenated version of the first vector embedding $x^q$ and the third vector embedding $x^b$. As further shown in FIG. 4, the first relational embedding $r^q$, the second relational embedding $r^a$, and the third relational embedding $r^b$ may be concatenated with concatenated version operation 436 and the concatenated version of the first relational embedding $r^q$, the second relational embedding $r^a$, and the third relational embedding $r^b$ may be provided as an input to final machine learning model 438 and an output may be generated based on the input (e.g., the concatenated version of the first relational embedding $r^q$, the second relational embedding $r^a$, and the third relational embedding $r^b$). The output of final machine learning model 438 may be used to determine whether the initial input is (e.g., is predicted to be) an adversarial example.

Referring now to FIGS. 5A-5D, FIGS. 5A-5D are diagrams of an implementation 500 of a process (e.g., process 300) for determining adversarial examples with relational embeddings. As illustrated in FIGS. 5A-5D, implementation 500 may include adversarial analysis system 102 performing the steps of the process using machine learning architecture 400 as an adversarial example detector. In some non-limiting embodiments or aspects, the steps of the process shown in FIGS. 5A-5D may be associated with a training process for machine learning architecture 400. For example, the steps of the process may be conducted during the training process for one or more components of machine learning architecture 400.

Figure 5A:
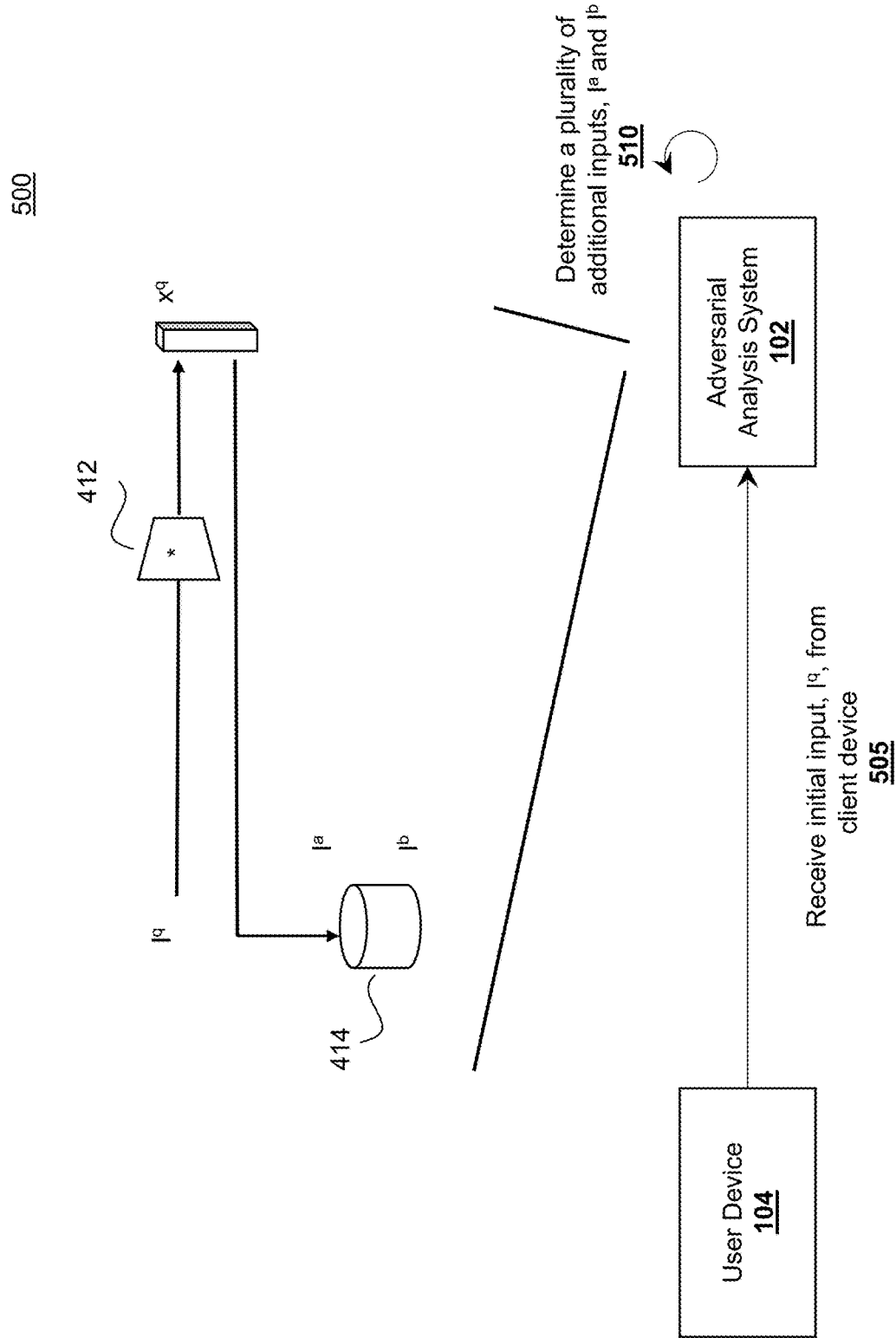

As shown by reference number 505 in FIG. 5A, adversarial analysis system 102 may receive an initial input $I^q$ from user device 104. In some non-limiting embodiments or aspects, adversarial analysis system 102 may determine that the initial input $I^q$ is associated with a potential adversarial example.

As shown by reference number 510 in FIG. 5A, adversarial analysis system 102 may determine a plurality of additional inputs, including first additional input $I^a$ and second additional input $I^b$. In some non-limiting embodiments or aspects, adversarial analysis system 102 may determine the plurality of additional inputs based on determining that the initial input $I^q$ is associated with a potential adversarial example. In some non-limiting embodiments or aspects, adversarial analysis system 102 may determine a classification (e.g., a predicted classification, an initial predicted classification, and/or the like) of the initial input $I^q$. In some non-limiting embodiments or aspects, adversarial analysis system 102 may select the first additional input $I^a$ and the second additional input $I^b$ from a training dataset stored in training database 414 based on the initial input $I^q$. For example, adversarial analysis system 102 may select the first additional input $I^a$ and the second additional input $I^b$ from the plurality of additional inputs in the training dataset that have a classification that is the same as the classification of the initial input $I^q$. In some non-limiting embodiments or aspects, adversarial analysis system 102 may select the first additional input $I^a$ based on a proximity of the first additional input $I^a$ to the initial input $I^q$. For example, adversarial analysis system 102 may select the first additional input $I^a$ from the plurality of additional inputs based on a distance in an embedding space to the initial input $I^q$, such that the first additional input $I^a$ has the smallest embedding distance to the initial input $I^q$ in the embedding space from the plurality of additional inputs.

In some non-limiting embodiments or aspects, adversarial analysis system 102 may select the second additional input $I^b$ based on a proximity of the second additional input $I^b$ to the first additional input $I^a$. For example, adversarial analysis system 102 may select the second additional input $I^b$ from the plurality of additional inputs based on a distance in the embedding space such that the second additional input $I^b$ has the smallest embedding distance to the first additional input $I^a$ in the embedding space from the plurality of additional inputs.

Figure 5C:
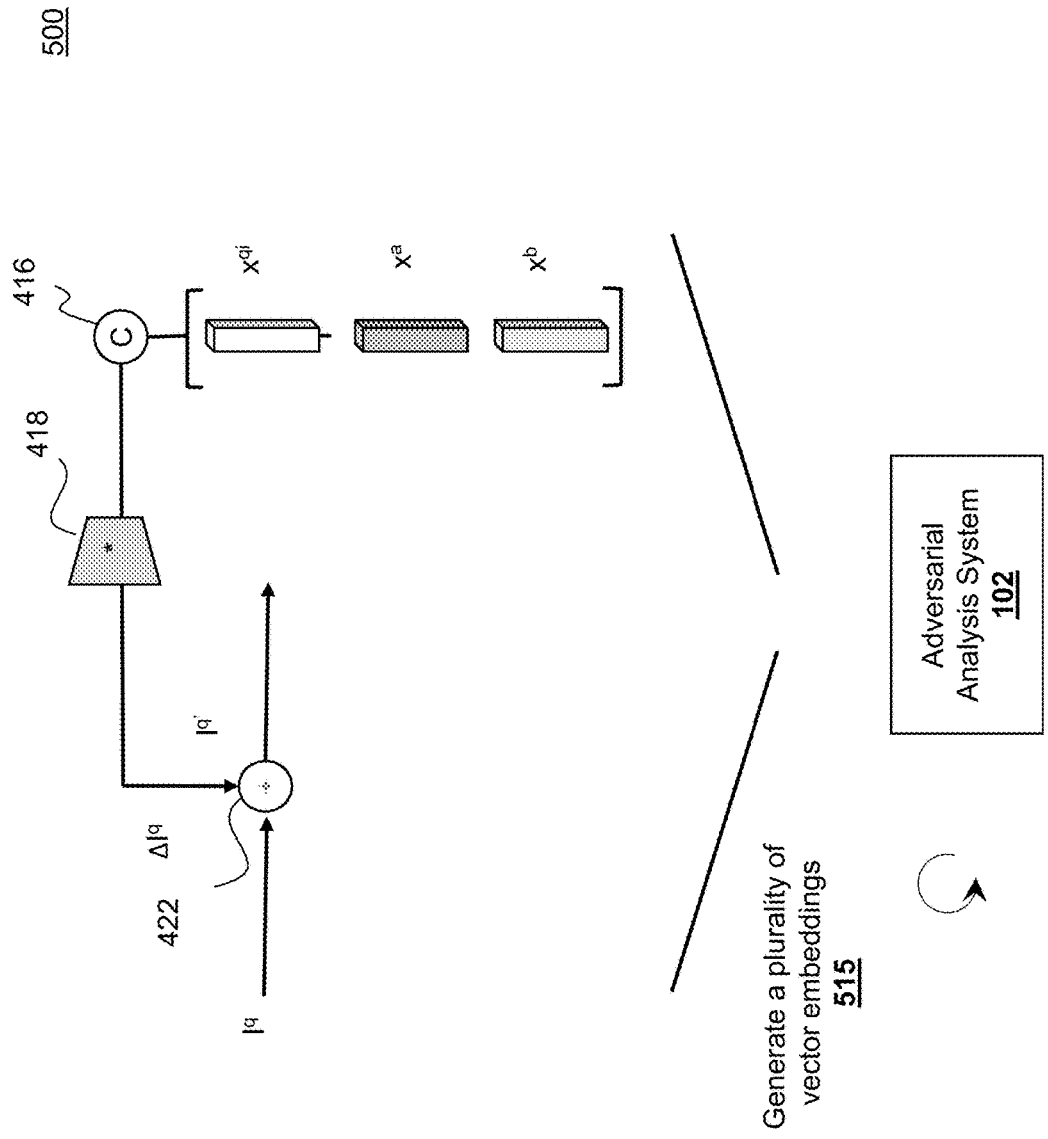
Figure 5D:
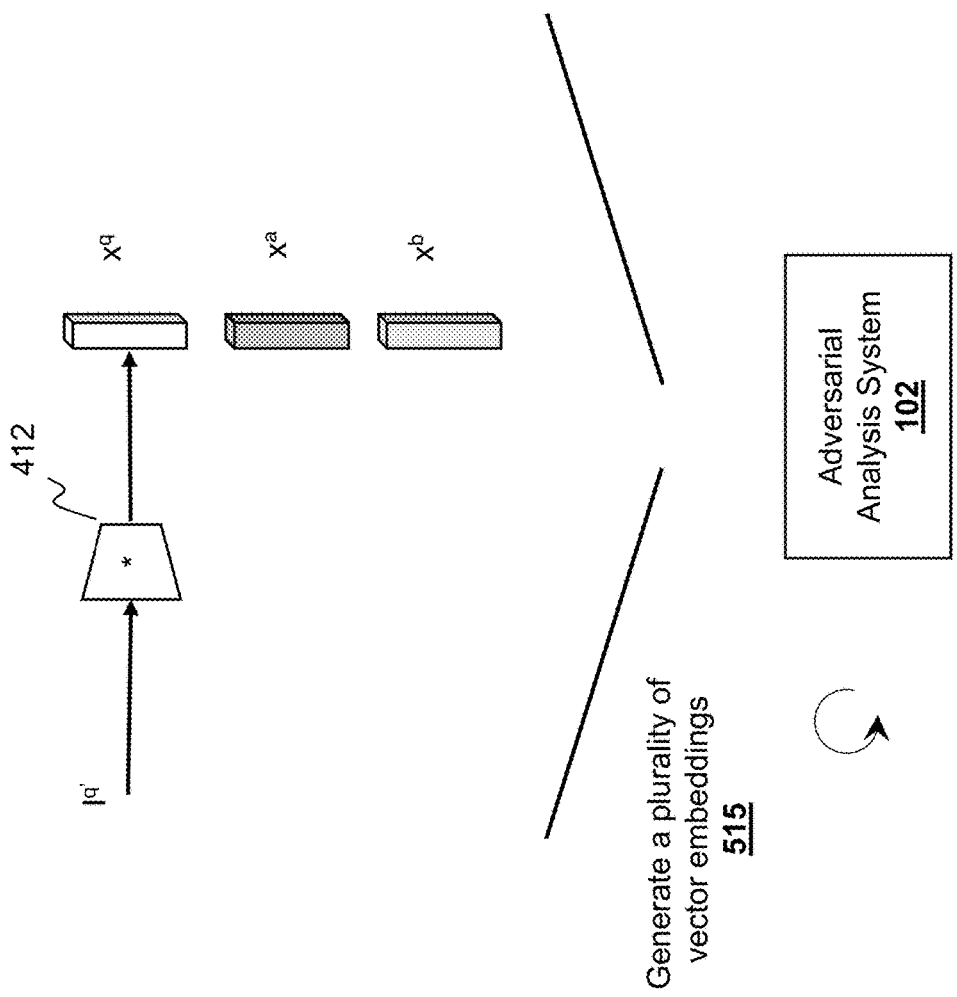

As shown by reference number 515 in FIGS. 5B-5D, adversarial analysis system 102 may generate a plurality of vector embeddings. As shown in FIG. 5B, adversarial analysis system 102 may generate the plurality of vector embeddings based on the initial input $I^q$, the first additional input $I^a$, and the second additional input $I^b$. In such an example, adversarial analysis system 102 may generate a first vector embedding $x^q$ based on an updated initial input $I^{q'}$ by generating a preliminary first vector embedding $x^{qi}$ based on the initial input $I^q$, a second vector embedding $x^a$ based on the first additional input $I^a$, and a third vector embedding $x^b$ based on the second additional input $I^b$. As further shown in FIG. 5B, adversarial analysis system 102 may generate the preliminary first vector embedding $x^{qi}$ based on the initial input $I^q$ by providing the initial input $I^q$ as an input to the initial machine learning model 412 of the critic network 410, generating an output of the initial machine learning model 412 based on the input (e.g., the initial input $I^q$), and extracting the preliminary first vector embedding $x^{qi}$ from one or more layers of the initial machine learning model 412. Additionally, adversarial analysis system 102 may generate the second vector embedding $x^a$ based on the first additional input $I^a$ and the third vector embedding $x^b$ based on the second additional input $I^b$.

As shown in FIG. 5C, adversarial analysis system 102 may concatenate the preliminary first vector embedding $x^{qi}$, the second vector embedding $x^a$, and the third vector embedding $x^b$ with concatenated version operation 416. Adversarial analysis system 102 may provide the concatenated version of the preliminary first vector embedding $x^{qi}$, the second vector embedding $x^a$, and the third vector embedding $x^b$ as an input to an additional machine learning model 418 of the critic network 410 and adversarial analysis system 102 may generate an output of the additional machine learning model 418 of the critic network 410 based on the input (e.g., the concatenated version of the preliminary first vector embedding $x^{qi}$, the second vector embedding $x^a$, and the third vector embedding $x^b$). As further shown in FIG. 5C, adversarial analysis system 102 may combine the output $\Delta I^q$ generated by the additional machine learning model 418 of the critic network 410 with the initial input using combination operation 422 to provide the updated initial input $I^q$.

As shown in FIG. 5D, adversarial analysis system 102 may provide the updated initial input $I^{q'}$ to the initial machine learning model 412 of the critic network 410 and adversarial analysis system 102 may generate the first vector embedding $x^q$ based on the updated initial input $I^{q'}$ by providing the updated initial input $I^{q'}$ as an input to the initial machine learning model 412 of the critic network 410, generating an output of the initial machine learning model 412 based on the input (e.g., the updated initial input $I^{q'}$), and extracting the first vector embedding $x^q$ from one or more layers of the initial machine learning model 412 of the critic network 410.

Figure 5E:
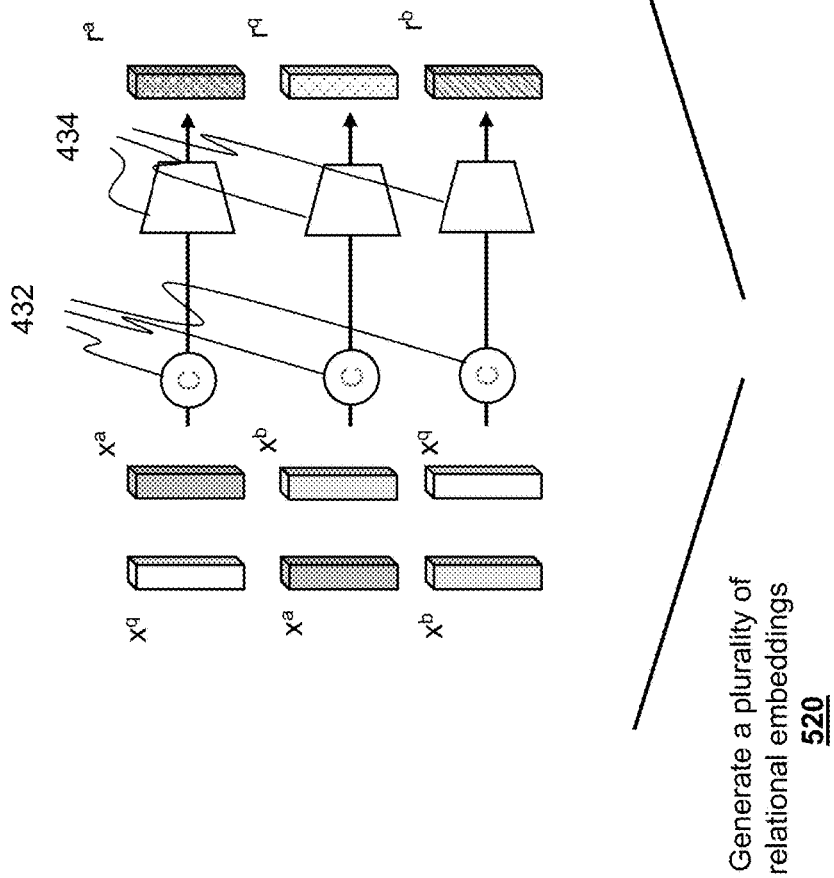

As shown by reference number 520 in FIG. 5E, adversarial analysis system 102 may generate the plurality of relational embeddings. For example, adversarial analysis system 102 may determine a first relational embedding $r^q$, a second relational embedding $r^a$, and a third relational embedding $r^b$ based on the first vector embedding $x^q$, the second vector embedding $x^a$, and the third vector embedding $x^b$. As shown in FIG. 5E, adversarial analysis system 102 may concatenate the first vector embedding $x^q$ and the second vector embedding $x^a$ with concatenated version operation 432, the first vector embedding $x^q$ and the third vector embedding $x^b$ with concatenated version operation 432, and the second vector embedding $x^a$ and the third vector embedding $x^b$ with concatenated version operation 432. Adversarial analysis system 102 may provide the concatenated version of the first vector embedding $x^q$ and the second vector embedding $x^a$, the concatenated version of the first vector embedding $x^q$ and the third vector embedding $x^b$, and the concatenated version of the second vector embedding $x^a$ and the third vector embedding $x^b$ as inputs (e.g., separate inputs) to the machine learning model 434 of the prototypical relation network 430. After providing the concatenated versions as inputs to the machine learning model 434, adversarial analysis system 102 may extract one or more layers of the machine learning model 434 to provide the plurality of embeddings. The one or more layers may include the first relational embedding $r^q$, the second relational embedding $r^a$, and/or the third relational embedding $r^b$.

Figure 5F:
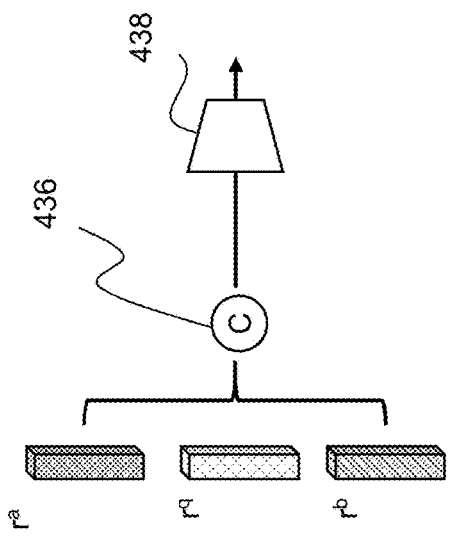
Figure 5F:

As shown by reference number 525 in FIG. 5F, adversarial analysis system 102 may determine whether the initial input $I^p$ is an adversarial example based on the plurality of relational embeddings. As shown in FIG. 5F, adversarial analysis system 102 may concatenate the first relational embedding $r^q$, the second relational embedding $r^a$, and the third relational embedding $r^b$ with concatenated version operation 436. Adversarial analysis system 102 may provide the concatenated version the of first relational embedding $r^q$, the second relational embedding $r^a$, and the third relational embedding $r^b$ as an input to final machine learning model 438 and adversarial analysis system 102 may generate an output of final machine learning model 438 based on the input (e.g., the concatenated version the of first relational embedding $r^q$, the second relational embedding $r^a$, and the third relational embedding $r^b$). In some non-limiting embodiments or aspects, the output of the final machine learning model 438 may include a prediction that indicates whether the initial input $I^p$ is an adversarial example. In some non-limiting embodiments or aspects, adversarial analysis system 102 may determine whether the initial input $I^p$ is an adversarial example based on the prediction.

In some non-limiting embodiments or aspects, adversarial analysis system 102 may supervise parameter learning of the initial machine learning model 412 of the critic network 410 and the additional machine learning model 418 of the critic network 410 according to the following formula:

$$L_{critic} = -l(\|x^{q'} - x^a\| + \|x^{q'} - x^b\|) + \lambda_1 \|\Delta I^q\|$$

In some non-limiting embodiments or aspects, adversarial analysis system 102 may supervise parameter learning of the machine learning model 434 of the prototypical relation network 430 according to the following formula:

$$L_{advocate} = l(\|r^q - r^a\| + \|r^q - r^b\|)$$

In some non-limiting embodiments or aspects, during training, adversarial analysis system 102 may couple the loss function $L_{advocate}$ with the cross entropy loss function of the final machine learning model 438 to train the parameters of the machine learning model 434 of the prototypical relation network 430 and the final machine learning model 438. In some non-limiting embodiments or aspects, during training, adversarial analysis system 102 may determine the overall loss function of machine learning architecture 400 according to the following formula:

$$L = L_{ce} + \lambda_2 L_{advocate} + \lambda_3 L_{critic}$$

where $\lambda_1$, $\lambda_2$, and $\lambda_3$ are parameters for training.

Figure 6:
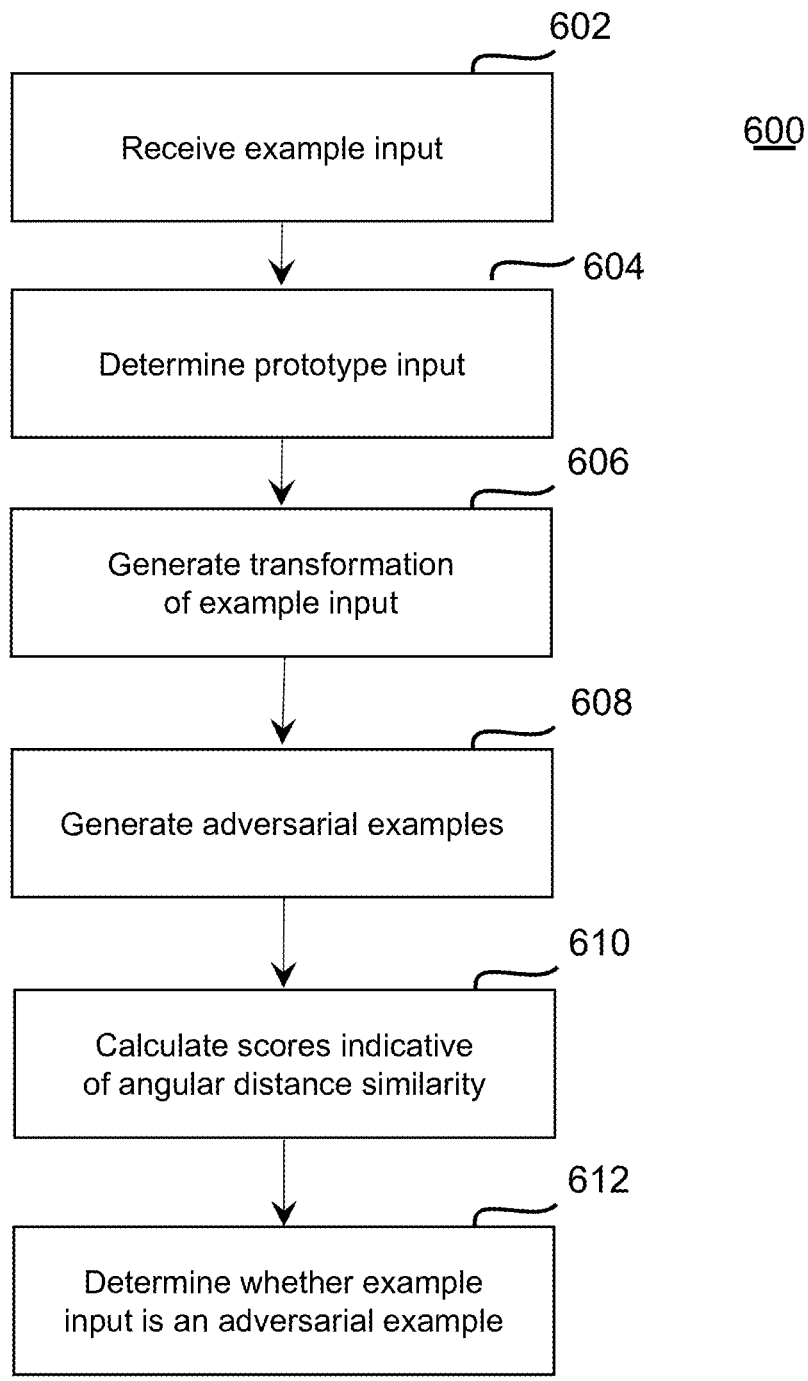
FIG. 6 is a flowchart of a non-limiting embodiment or aspect of a process for determining adversarial examples with adversarial gradient directions.

Referring now to FIG. 6, FIG. 6 is a flowchart of a non-limiting aspect or embodiment of a process 600 for determining adversarial examples with adversarial gradient directions. In some non-limiting embodiments or aspects, one or more of the functions described with respect to process 600 may be performed (e.g., completely, partially, etc.) by adversarial analysis system 102. In some non-limiting embodiments or aspects, one or more of the steps of process 600 may be performed (e.g., completely, partially, and/or the like) by another device or a group of devices separate from and/or including adversarial analysis system 102, such as input database 102a, and/or user device 104.

As shown in FIG. 6, at step 602, process 600 may include receiving an example input. For example, adversarial analysis system 102 may receive one or more example inputs (e.g., one example input, a plurality of example inputs, and/or the like) from a device (e.g., user device 104 and/or a device associated with a merchant, a payment gateway, an acquirer, an issuer, and/or the like). In some non-limiting embodiments or aspects, adversarial analysis system 102 may determine that the example input is associated with an adversarial example (e.g., a potential adversarial example). For example, adversarial analysis system 102 may determine that the example input may be associated with an adversarial example based on the device that transmitted the initial input to adversarial analysis system 102. In some non-limiting embodiments or aspects, an input (e.g., the initial example input, one or more additional example inputs, and/or the like) to adversarial analysis system 102 may include one or more images, one or more videos, one or more voice recordings, one or more key-board strokes, one or more transactions, and/or the like. In some non-limiting embodiments or aspects, an input may include one or more data points. In some non-limiting embodiments or aspects, adversarial analysis system 102 may receive the example input by sampling a layer of a neural network (e.g., a deep neural network) to obtain a sample, and the example input may include the sample. In some non-limiting embodiments or aspects, the sample may include an output of a layer of the neural network.

In some non-limiting embodiments or aspects, adversarial analysis system 102 may determine a classification (e.g., a predicted classification, an initial predicted classification, and/or the like) of the example input. For example, adversarial analysis system 102 may determine the classification of the example input by providing the example input as an input to a machine learning model (e.g., a machine learning model that includes a random forest, a multilayer perceptron, and/or a neural network, such as a deep neural network) and determine the classification based on an output from the machine learning model (e.g., as the output from the machine learning model). In some non-limiting embodiments or aspects, the machine learning model may be a machine learning classifier that is trained on a training dataset that includes a plurality of inputs. For example, the machine learning model may be a machine learning classifier that includes a deep learning network. In some non-limiting embodiments or aspects, the classification may be associated with a class that includes a group of members and the classification may refer to a characteristic that shared among the members of the group in the class. In some non-limiting embodiments or aspects, adversarial analysis system 102 may store the training dataset in input database 102a.

In some non-limiting embodiments or aspects, adversarial analysis system 102 may determine a predicted classification of the example input. For example, adversarial analysis system 102 may determine the predicted classification of the example input using a machine learning model that was trained on a training dataset that includes inputs similar to the example input. In some non-limiting embodiments or aspects, adversarial analysis system 102 may determine a plurality of predicted classifications of the example input. For example, adversarial analysis system 102 may determine a first predicted classification of the example input, a second predicted classification of the example input, and/or a third predicted classification of the example input based on a predetermined number of predicted classifications.

As shown in FIG. 6, at step 604, process 600 may include determining a prototype input. For example, adversarial analysis system 102 may determine the prototype input based on the example input. In some non-limiting embodiments or aspects, adversarial analysis system 102 may determine the prototype input based on receiving the example input. In some non-limiting embodiments or aspects, adversarial analysis system 102 may determine the prototype input based on determining that the example input is associated with an adversarial example. In some non-limiting embodiments or aspects, adversarial analysis system 102 may determine the prototype input from a plurality of inputs in a group (e.g., a training dataset) having a classification. For example, adversarial analysis system 102 may determine the prototype input from a plurality of inputs stored in input database 102*a* in the group having the same classification.

In some non-limiting embodiments or aspects, adversarial analysis system 102 may select the prototype input from a plurality of inputs (e.g., a plurality of inputs in a training dataset) based on the example input. For example, adversarial analysis system 102 may select the prototype from a training dataset that has a classification that is the same as a classification (e.g., the predicted classification) of the example input. In some non-limiting embodiments or aspects, the training dataset may be the training dataset that was used to training the machine learning model (e.g., the machine learning classifier) that was used to determine a classification of the example input. In some non-limiting embodiments or aspects, adversarial analysis system 102 may store the prototype input in input database 102*a*.

In some non-limiting embodiments or aspects, adversarial analysis system 102 may determine the prototype input based on a relationship of the example input to the prototype input. For example, adversarial analysis system 102 may determine the prototype input based on adversarial analysis system 102 determining the relationship between the example input and the prototype input. When determining the relationship between the example input and the prototype input, adversarial analysis system 102 may compare the example input to a plurality of inputs (e.g., a plurality of inputs in a training dataset) stored in input database 102*a* having a classification. In such an example, adversarial analysis system 102 may determine the proximity of the example input to one or more inputs of the plurality of inputs. Adversarial analysis system 102 may then compare the distance (e.g., vector distance) of the example input to the one or more inputs of the plurality of inputs and select the prototype input based on comparing the distances of the example input to the one or more inputs. In some non-limiting embodiments or aspects, adversarial analysis system 102 may select the prototype input from the plurality of inputs based on the prototype input having the smallest distance to the example input from the plurality of additional inputs. In some non-limiting embodiments or aspects, adversarial analysis system 102 may select the prototype input from the plurality of inputs based on determining that the distance of the example input to the prototype input is the shortest (e.g., that the prototype input is a nearest neighbor) when compared to the distance of the example input to the other inputs of the plurality of inputs.

In some non-limiting embodiments or aspects, adversarial analysis system 102 may determine a second prototype input from a plurality of inputs. For example, adversarial analysis system 102 may determine a second prototype input from the plurality of inputs having a classification that is the same as the second predicted classification of the example input. In some non-limiting embodiments or aspects, adversarial analysis system 102 may determine a plurality of prototype inputs from the plurality of inputs having a classification that is the same as each of the plurality of predicted classifications of the example input.

As shown in FIG. 6, at step 606, process 600 may include generating a transformation of the example input. For example, adversarial analysis system 102 may generate the transformation of the example input. In some non-limiting embodiments or aspects, adversarial analysis system 102 may generate a plurality of transformations of the example input. In some non-limiting embodiments or aspects, adversarial analysis system 102 may generate the transformation of the example input by applying one or more random perturbations (e.g., a single random perturbation, a plurality of perturbations, and/or the like) to the example input. In some non-limiting embodiments or aspects, adversarial analysis system 102 may generate the transformation of the example input by applying a Gaussian perturbation to the example input.

As shown in FIG. 6, at step 608, process 600 may include generating adversarial examples. For example, adversarial analysis system 102 may generate adversarial examples of each of the example input, the prototype input, and the transformation of the example input. In some non-limiting embodiments or aspects, adversarial analysis system 102 may generate adversarial examples of each of the example input, the prototype input, and the transformation of the example input using a technique for generating adversarial examples (e.g., a gradient based adversarial attack technique), such as Fast Sign Gradient Method (FSGM) or Projected Gradient Descent (PGD). In some non-limiting embodiments or aspects, adversarial analysis system 102 may generate adversarial examples of each of the example input, the prototype input, and the transformation of the example input based on selecting a target classification (e.g., a target classification to attack for the adversarial example). For example, adversarial analysis system 102 may select the target classification based on the predicted classification of the example input or based on an arbitrary classification. In such an example, the target classification may be the same as the predicted classification of the example input. Further, adversarial analysis system 102 may generate adversarial examples of each of the example input, the prototype input, and the transformation of the example input using the target classification.

As shown in FIG. 6, at step 610, process 600 may include calculating scores indicative of angular distance similarity. For example, adversarial analysis system 102 may calculate a plurality of scores indicative of angular distance similarity between the adversarial example for the example input and the adversarial example for the prototype input, the adversarial example for the example input and the adversarial example for the transformation of the example input, and/or the adversarial example for the prototype input and the adversarial example for the transformation of the example input.

In some non-limiting embodiments or aspects, adversarial analysis system 102 may calculate angular distance similarity scores for the adversarial examples for each pair of inputs of a plurality of inputs. For example, adversarial analysis system 102 may calculate angular distance similarity scores for each of the adversarial examples for the example input and the adversarial example for the prototype input, the adversarial example for the example input and the adversarial example for the transformation of the example input, and/or the adversarial example for the prototype input and the adversarial example for the transformation of the example input. In some non-limiting embodiments or aspects, adversarial analysis system 102 may calculate the angular distance similarity scores for adversarial examples for each pair of inputs of the plurality of inputs based on the adversarial gradient direction of each input included in a pair of inputs.

In some non-limiting embodiments or aspects, adversarial analysis system 102 may determine an adversarial gradient direction of the adversarial example for the example input, an adversarial gradient direction of the adversarial example for the prototype input, and/or an adversarial gradient direction of the adversarial example for the transformation of the example input. In some non-limiting embodiments or aspects, the adversarial gradient direction may be a direction (e.g., a moving direction) of a vector that starts from an input (e.g., the example input, the prototype input, or the transformation of the example input) and that ends at a generated adversarial example for the input, where the generated adversarial example is specified for a classification of the input. Additionally, the adversarial gradient direction may be associated with a layer of a network (e.g., a deep network). For example, the adversarial gradient direction may be associated with a layer of a network from which the example input was received. In some non-limiting embodiments or aspects, angular similarities (e.g., angular distance similarity scores) between adversarial gradient directions are determined and used to determine whether the example input is an adversarial example by adversarial analysis system 102.

In some non-limiting embodiments or aspects, adversarial analysis system 102 may calculate an angular distance similarity score based on the adversarial example for the example input and the adversarial example for the prototype input, where the angular distance similarity score for the adversarial example for the example input and the adversarial example for the prototype input indicates an angular distance similarity between an adversarial gradient direction of the adversarial example for the example input and an adversarial gradient direction of the adversarial example for the prototype input. In some non-limiting embodiments or aspects, adversarial analysis system 102 may calculate an angular distance similarity score based on the adversarial example for the example input and the adversarial example for the transformation of the example input, where the angular distance similarity score for the adversarial example for the example input and the adversarial example for the transformation of the example input indicates an angular distance similarity between an adversarial gradient direction of the adversarial example for the example input and an adversarial gradient direction of the adversarial example for the prototype input. In some non-limiting embodiments or aspects, adversarial analysis system 102 may calculate an angular distance similarity score based on the adversarial example for the prototype input and the adversarial example for the transformation of the example input, where the angular distance similarity score for the adversarial example for the prototype input and the adversarial example for the transformation of the example input indicates an angular distance similarity between an adversarial gradient direction of the adversarial example for the prototype input and an adversarial gradient direction of the adversarial example for the transformation of the example input.

In some non-limiting embodiments or aspects, adversarial analysis system 102 may calculate the angular distance similarity score based on determining a distance as a distance vector (e.g., a vector that includes a distance, such as a Euclidean distance) between the adversarial examples for two inputs; a first input and a second input (e.g., the example input and the prototype input, the example input and the transformation of the example input, the prototype input and the transformation of the example input, and/or the like). In some non-limiting embodiments or aspects, adversarial analysis system 102 may calculate the angular distance similarity score by calculating a difference of median angular distance between the adversarial example for the first input (e.g., the example input) and the adversarial example for the second input (e.g., the prototype input).

As shown in FIG. 6, at step 612, process 600 may include determining whether the example input is adversarial. For example, adversarial analysis system 102 may determine whether the example input is an adversarial example based on the angular distance similarity score based on the adversarial example for the example input and the adversarial example for the prototype input, the angular distance similarity score based on the adversarial example for the example input and the adversarial example for the transformation of the example input, and the angular distance similarity score based on the adversarial example for the prototype input and the adversarial example for the transformation of the example input.

In some non-limiting embodiments or aspects, adversarial analysis system 102 may train a classifier based on the angular distance similarity score for the adversarial example for the example input and the adversarial example for the prototype input, the angular distance similarity score for the adversarial example for the example input and the adversarial example for the transformation of the example input, and the angular distance similarity score for the adversarial example for the prototype input and the adversarial example for the transformation of the example input, and adversarial analysis system 102 may determine whether the example input is an adversarial example using the classifier.

In some non-limiting embodiments or aspects, a process for determining adversarial examples with adversarial gradient directions may be implemented according to the following algorithm. In some non-limiting embodiments or aspects, one or more of the functions described with respect to the algorithm may be performed (e.g., completely, partially, etc.) by adversarial analysis system 102. In some non-limiting embodiments or aspects, one or more of the steps of the algorithm may be performed (e.g., completely, partially, and/or the like) by another device or a group of devices separate from and/or including adversarial analysis system 102, such as input database 102a, and/or user device 104. In some non-limiting embodiments or aspects, the one or more of the functions described with respect to the algorithm may be the same or similar as those described with regard to process 600.

In some non-limiting embodiments or aspects, adversarial analysis system 102 may determine a plurality of predicted classifications a of an example input $I^q$ by providing the example input $I^q$ as an input to a classification machine learning model f(*) according to: $a=f(I^q)$. In some non-limiting embodiments or aspects, adversarial analysis system 102 may store the top K class indices of example input $I^q$ in a set $C=\{a, c_2, \ldots c_k\}$. In some non-limiting embodiments or aspects, adversarial analysis system 102 may select a prototype input $I^p$ from a subset D' of a training dataset D based on the predicted classification a of $I^q$. In some non-limiting embodiments or aspects, the subset D' includes inputs having the predicted classification a of $I^q$. In some non-limiting embodiments or aspects, adversarial analysis system 102 may generate a transformation $Y^p$ of the example input $I^q$ based on a perturbation T, where $Y^p=I^q*T$. In some non-limiting embodiments or aspects, adversarial analysis system 102 may initialize an empty feature vector $v=\{\ \}$. In some non-limiting embodiments or aspects, adversarial analysis system 102 may, for each $c_k \in C$, perform the following operations to generate adversarial examples:

Run FGSM: $Y_k^p=Y^q+\varepsilon_o \, \text{sign}(\nabla\emptyset(Y^q,c_k))$;

Run FGSM: $I_k^n=I^n+\varepsilon_o \, \text{sign}(\nabla\emptyset(I^n,c_k))$;

Run FGSM: $Y_k^p=Y^q+\varepsilon_o \, \text{sign}(\nabla\emptyset(Y^q,c_k))$

In some non-limiting embodiments or aspects, adversarial analysis system 102 may, for each $c_k \in C$, determine the following adversarial gradient directions targeted at class $c_k$:

$$\Delta f^m(Y_k^q, c_k) = f^m(Y_k^q) - f^m(Y^q);$$

$$\Delta f^m(I_k^q, c_k) = f^m(I_k^q) - f^m(I^q);$$

$$\Delta f^m(I_k^n, c_k) = f^m(I_k^n) - f^m(I^n);$$

In some non-limiting embodiments or aspects, adversarial analysis system 102 may, for each $c_k \in C$, determine a score that is indicative of angular distance similarity between the transformation $Y^p$ of the example input $I^q$ and the example input $I^q$:

$$r_k^0 = \langle \Delta f^m(Y_k^q, c_k), \Delta f^m(I_k^q, c_k) \rangle;$$

In some non-limiting embodiments or aspects, adversarial analysis system 102 may, for each $c_k \in C$, determine a score that is indicative of angular distance similarity between the example input $I^q$ and the prototype input $I^n$:

$$r_k^1 = \langle \Delta f^m(I_k^q, c_k), \Delta f^m(I_k^n, c_k) \rangle;$$

In some non-limiting embodiments or aspects, adversarial analysis system 102 may, for each $c_k \in C$, determine a score that is indicative of angular distance similarity between t the transformation $Y^p$ of the example input $I^q$ and the prototype input $I^n$:

$$r_k^2 = \langle \Delta f^m(Y_k^q, c_k), \Delta f^m(I_k^n, c_k) \rangle;$$

In some non-limiting embodiments or aspects, adversarial analysis system 102 may store the scores in the feature vector:

$$v = v \cup \{r_k^0, r_k^1, r_k^2\};$$

In some non-limiting embodiments or aspects, adversarial analysis system 102 may determine whether the example input is an adversarial example based on the scores that are indicative of angular distance similarity according to the following:

$$\tau(I^q) \rightarrow [0,1];$$

$$\tau(I^q) = S_k(v);$$

$$\tau(I^q) = S_k(\{r_a^0, r_a^1, r_a^2, r_{c1}^0, r_{c1}^1, r_{c1}^2 \ldots r_K^0, r_K^1, r_K^2\})$$

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system for determining adversarial examples, comprising:
   at least one processor programmed or configured to:
   receive an initial input;
   select a first additional input from a plurality of additional inputs having a classification based on a proximity of the first additional input to the initial input;
   select a second additional input from the plurality of additional inputs having the classification based on a proximity of the second additional input to the first additional input;
   generate a first vector embedding based on the initial input;
   generate a second vector embedding based on the first additional input;
   generate a third vector embedding based on the second additional input;
   generate a first relational embedding based on the first vector embedding and the second vector embedding, wherein, when generating the first relational embedding, the at least one processor is programmed or configured to:
      concatenate the first vector embedding and the second vector embedding to provide a concatenated version of the first vector embedding and the second vector embedding;
      provide the concatenated version of the first vector embedding and the second vector embedding as a first input to a machine learning model;
      generate a first output of the machine learning model based on the first input; and
      extract a first layer of the machine learning model, wherein the first layer comprises the first relational embedding;
   generate a second relational embedding based on the second vector embedding and the third vector embedding, wherein, when generating the second relational embedding, the at least one processor is programmed or configured to:
      concatenate the second vector embedding and the third vector embedding to provide a concatenated version of the second vector embedding and the third vector embedding;
      provide the concatenated version of the second vector embedding and the third vector embedding as a second input to the machine learning model;
      generate a second output of the machine learning model based on the second input; and
      extract a second layer of the machine learning model, wherein the second layer comprises the second relational embedding;
   generate a third relational embedding based on the third vector embedding and the first vector embedding, wherein, when generating the third relational embedding, the at least one processor is programmed or configured to:
      concatenate the first vector embedding and the third vector embedding to provide a concatenated version of the first vector embedding and the third vector embedding;
      provide the concatenated version of the first vector embedding and the third vector embedding as a third input to the machine learning model;
      generate a third output of the machine learning model based on the third input; and
      extract a third layer of the machine learning model, wherein the third layer comprises the third relational embedding;
   concatenate the first relational embedding, the second relational embedding, and the third relational embedding to provide a concatenated relational embedding, wherein the concatenated relational embedding comprises a concatenated version of the first relational embedding, the second relational embedding, and the third relational embedding; and determine whether the initial input is an adversarial example based on the concatenated relational embedding.

2. The system of claim 1, wherein, when generating the first vector embedding, the at least one processor is programmed or configured to:
provide the initial input as a first input to an initial machine learning model;
generate a first output of the initial machine learning model based on the first input; and
extract a first layer of the initial machine learning model, wherein the first layer comprises the first vector embedding;
wherein, when generating the second vector embedding, the at least one processor is programmed or configured to:
provide the first additional input as a second input to the initial machine learning model;
generate a second output of the initial machine learning model based on the second input; and
extract a second layer of the initial machine learning model, wherein the second layer comprises the second vector embedding; and
wherein, when generating the third vector embedding, the at least one processor is programmed or configured to:
provide the second additional input as a third input to the initial machine learning model;
generate a third output of the initial machine learning model based on the third input; and
extract a third layer of the initial machine learning model, wherein the third layer comprises the third vector embedding.

3. The system of claim 2, wherein the initial machine learning model comprises a convolutional neural network.

4. The system of claim 1, wherein the machine learning model comprises a multilayer perceptron.

5. The system of claim 1, wherein, when determining whether the initial input is an adversarial example, the at least one processor is programmed or configured to:
provide the concatenated relational embedding as an input to a machine learning model;
generate an output of the machine learning model, wherein the output comprises a prediction that indicates whether the initial input is an adversarial example; and
determine whether the initial input is an adversarial example based on the prediction.

6. The system of claim 5, wherein the machine learning model comprises a multilayer perceptron.

7. The system of claim 1, wherein, when generating the first vector embedding, the at least one processor is programmed or configured to:
provide the initial input as a first input to an initial machine learning model;
generate a first output of the initial machine learning model based on the first input;
extract a first layer of the initial machine learning model, wherein the first layer comprises a preliminary first vector embedding;
concatenate the preliminary first vector embedding, the second vector embedding, and the third vector embedding to provide a concatenated version of the preliminary first vector embedding, the second vector embedding, and the third vector embedding;
provide the concatenated version of the preliminary first vector embedding, the second vector embedding, and the third vector embedding as an input to an additional machine learning model; generate an output of the additional machine learning model based on the input, wherein the output of the additional machine learning model comprises an updated initial input;
provide the updated initial input as a second input to the initial machine learning model;
generate a second output of the initial machine learning model based on the second input; and
extract a second layer of the initial machine learning model, wherein the second layer comprises the first vector embedding.

8. A computer-implemented method for determining adversarial examples, the method comprising:
selecting, with at least one processor, a first additional input from a plurality of additional inputs having a classification based on a proximity of the first additional input to an initial input;
selecting, with the at least one processor, a second additional input from the plurality of additional inputs having the classification based on a proximity of the second additional input to the first additional input;
generating, with the at least one processor, a first vector embedding based on the initial input, a second vector embedding based on the first additional input, and a third vector embedding based on the second additional input;
generating, with the at least one processor, a first relational embedding based on the first vector embedding and the second vector embedding, wherein generating the first relational embedding comprises:
concatenating the first vector embedding and the second vector embedding to provide a concatenated version of the first vector embedding and the second vector embedding;
providing the concatenated version of the first vector embedding and the second vector embedding as a first input to a machine learning model;
generating a first output of the machine learning model based on the first input; and
extracting a first layer of the machine learning model, wherein the first layer comprises the first relational embedding;
generating, with the at least one processor, a second relational embedding based on the second vector embedding and the third vector embedding, wherein generating the second relational embedding comprises:
concatenating the second vector embedding and the third vector embedding to provide a concatenated version of the second vector embedding and the third vector embedding;
providing the concatenated version of the second vector embedding and the third vector embedding as a second input to the machine learning model;
generating a second output of the machine learning model based on the second input; and
extracting a second layer of the machine learning model, wherein the second layer comprises the second relational embedding;
generating, with the at least one processor, a third relational embedding based on the third vector embedding and the first vector embedding, wherein generating the third relational embedding comprises:
concatenating the first vector embedding and the third vector embedding to provide a concatenated version of the first vector embedding and the third vector embedding;

providing the concatenated version of the first vector
embedding and the third vector embedding as a third
input to the machine learning model;
generating a third output of the machine learning model
based on the third input; and
extract a third layer of the machine learning model,
wherein the third layer comprises the third relational
embedding;
concatenating, with the at least one processor, the first
relational embedding, the second relational embedding,
and the third relational embedding to generate a concatenated relational embedding; and
determining, with the at least one processor, that the initial
input is an adversarial example based on the concatenated relational embedding.

9. The computer-implemented method of claim 8, wherein generating the first vector embedding comprises:
providing the initial input as a first input to an initial
machine learning model;
generating a first output of the initial machine learning
model based on the first input; and
extracting a first layer of the initial machine learning
model, wherein the first layer comprises the first vector
embedding;
wherein generating the second vector embedding comprises:
providing the first additional input as a second input to
the initial machine learning model;
generating a second output of the initial machine learning model based on the second input; and
extracting a second layer of the initial machine learning
model, wherein the second layer comprises the second vector embedding; and
wherein generating the third vector embedding comprises:
providing the second additional input as a third input to
the initial machine learning model;
generating a third output of the initial machine learning
model based on the third input; and
extracting a third layer of the initial machine learning
model, wherein the third layer comprises the third
vector embedding.

10. The computer-implemented method of claim 8, wherein determining whether the initial input is an adversarial example comprises:
providing the concatenated relational embedding as an
input to a machine learning model;
generating an output of the machine learning model,
wherein the output comprises a prediction that indicates
whether the initial input is an adversarial example; and
determining whether the initial input is an adversarial
example based on the prediction.

11. The computer-implemented method of claim 8, wherein generating the first vector embedding comprises:
providing the initial input as a first input to an initial
machine learning model;
generating a first output of the initial machine learning
model based on the first input;
extracting a first layer of the initial machine learning
model, wherein the first layer comprises a preliminary
first vector embedding;
concatenating the preliminary first vector embedding, the
second vector embedding, and the third vector embedding to provide a concatenated version of the preliminary first vector embedding, the second vector embedding, and the third vector embedding;
providing the concatenated version of the preliminary first
vector embedding, the second vector embedding, and
the third vector embedding as an input to an additional
machine learning model;
generating an output of the additional machine learning
model based on the input, wherein the output of the
additional machine learning model comprises an
updated initial input;
providing the updated initial input as a second input to the
initial machine learning model;
generating a second output of the initial machine learning
model based on the second input; and
extracting a second layer of the initial machine learning
model, wherein the second layer comprises the first
vector embedding.

12. A computer program product for determining adversarial examples, the computer program product comprising at least one non-transitory computer-readable medium including one or more instructions that, when executed by at least one processor, cause the at least one processor to:
select a first additional input from a plurality of additional
inputs having a classification based on a proximity of
the first additional input to an initial input;
select a second additional input from the plurality of
additional inputs having the classification based on a
proximity of the second additional input to the first
additional input;
generate a first vector embedding based on the initial
input;
generate a second vector embedding based on the first
additional input;
generate a third vector embedding based on the second
additional input;
generate a first relational embedding based on the first
vector embedding and the second vector embedding,
wherein, the one or more instructions that cause the at
least one processor to generate the first relational
embedding, cause the at least one processor to:
concatenate the first vector embedding and the second
vector embedding to provide a concatenated version
of the first vector embedding and the second vector
embedding;
provide the concatenated version of the first vector
embedding and the second vector embedding as a
first input to a machine learning model;
generate a first output of the machine learning model
based on the first input; and
extract a first layer of the machine learning model,
wherein the first layer comprises the first relational
embedding;
generate a second relational embedding based on the
second vector embedding and the third vector embedding, wherein, the one or more instructions that cause
the at least one processor to generate the second
relational embedding, cause the at least one processor
to:
concatenate the second vector embedding and the third
vector embedding to provide a concatenated version
of the second vector embedding and the third vector
embedding;
provide the concatenated version of the second vector
embedding and the third vector embedding as a
second input to the machine learning model;
generate a second output of the machine learning model
based on the second input; and extract a second layer of the machine learning model, wherein the second layer comprises the second relational embedding;

generate a third relational embedding based on the third vector embedding and the first vector embedding, wherein, the one or more instructions that cause the at least one processor to generate the third relational embedding, cause the at least one processor to:

concatenate the first vector embedding and the third vector embedding to provide a concatenated version of the first vector embedding and the third vector embedding;

provide the concatenated version of the first vector embedding and the third vector embedding as a third input to the machine learning model;

generate a third output of the machine learning model based on the third input; and extract a third layer of the machine learning model, wherein the third layer comprises the third relational embedding;

concatenate the first relational embedding, the second relational embedding, and the third relational embedding to generate a concatenated relational embedding; and determine whether the initial input is an adversarial example based on the concatenated relational embedding.

13. The computer program product of claim 12, wherein, the one or more instructions that cause the at least one processor to generate the first vector embedding, cause the at least one processor to:

provide the initial input as a first input to an initial machine learning model;

generate a first output of the initial machine learning model based on the first input; and extract a first layer of the initial machine learning model, wherein the first layer comprises the first vector embedding;

wherein, the one or more instructions that cause the at least one processor to generate the second vector embedding, cause the at least one processor to:

provide the first additional input as a second input to the initial machine learning model;

generate a second output of the initial machine learning model based on the second input; and extract a second layer of the initial machine learning model, wherein the second layer comprises the second vector embedding; and wherein, the one or more instructions that cause the at least one processor to generate the third vector embedding, cause the at least one processor to:

provide the second additional input as a third input to the initial machine learning model;

generate a third output of the initial machine learning model based on the third input; and extract a third layer of the initial machine learning model, wherein the third layer comprises the third vector embedding.

14. The computer program product of claim 13, wherein the initial machine learning model comprises a convolutional neural network.

15. The computer program product of claim 14, wherein the machine learning model comprises a multilayer perceptron.

16. The computer program product of claim 12, wherein, the one or more instructions that cause the at least one processor to determine whether the initial input is an adversarial example, cause the at least one processor to:

provide the concatenated relational embedding as an input to a machine learning model;

generate an output of the machine learning model, wherein the output comprises a prediction that indicates whether the initial input is an adversarial example; and determine whether the initial input is an adversarial example based on the prediction.

17. The computer program product of claim 12, wherein, the one or more instructions that cause the at least one processor to generate the first vector embedding, cause the at least one processor to:

provide the initial input as a first input to an initial machine learning model;

generate a first output of the initial machine learning model based on the first input;

extract a first layer of the initial machine learning model, wherein the first layer comprises a preliminary first vector embedding;

concatenate the preliminary first vector embedding, the second vector embedding, and the third vector embedding to provide a concatenated version of the preliminary first vector embedding, the second vector embedding, and the third vector embedding;

provide the concatenated version of the preliminary first vector embedding, the second vector embedding, and the third vector embedding as an input to an additional machine learning model;

generate an output of the additional machine learning model based on the input, wherein the output of the additional machine learning model comprises an updated initial input;

provide the updated initial input as a second input to the initial machine learning model;

generate a second output of the initial machine learning model based on the second input; and extract a second layer of the initial machine learning model, wherein the second layer comprises the first vector embedding.

* * * * *